US010706264B2

(12) United States Patent
Ahn et al.

(10) Patent No.: US 10,706,264 B2
(45) Date of Patent: Jul. 7, 2020

(54) MOBILE TERMINAL PROVIDING FACE RECOGNITION USING GLANCE SENSOR

(71) Applicant: LG ELECTRONICS INC., Seoul (KR)

(72) Inventors: Saeyoung Ahn, Seoul (KR); Jungwhan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 239 days.

(21) Appl. No.: 15/955,352

(22) Filed: Apr. 17, 2018

(65) Prior Publication Data
US 2019/0042831 A1 Feb. 7, 2019

(30) Foreign Application Priority Data
Aug. 1, 2017 (KR) .................. 10-2017-0097533

(51) Int. Cl.
G06K 9/00 (2006.01)
G06K 9/20 (2006.01)

(52) U.S. Cl.
CPC ..... G06K 9/00268 (2013.01); G06K 9/00201 (2013.01); G06K 9/00255 (2013.01); G06K 9/209 (2013.01); H04M 2250/52 (2013.01)

(58) Field of Classification Search
CPC ........... G06K 9/00268; G06K 9/00201; G06K 9/00255; G06K 9/209; G06K 9/00604; G06K 9/00302; G06K 9/00208; G06K 9/00295; G06T 7/593; G06T 7/74; G06T 7/70; G06T 7/85; G06T 7/97; G06T 2207/10012; G06T 2207/30201; H04N 2013/0081; H04N 13/239; H04N 13/271; H04N 13/128; H04N 5/247; H04N 5/2258;
(Continued)

(56) References Cited
U.S. PATENT DOCUMENTS 8,913,119 B2 * 12/2014 Choi .................. A61B 5/0077
348/78
9,041,776 B2 * 5/2015 Chou .................. H04N 13/271
348/46
(Continued)

FOREIGN PATENT DOCUMENTS
WO WO 2018/021843 A1 2/2018

OTHER PUBLICATIONS

Anonymous, "3D (three-dimensional) Face Authentication for Unlocking a Mobile Device," Research Disclosure, Oct. 2012 (published online Sep. 14, 2012), XP007141648, 2 pages.
(Continued)

Primary Examiner — Michael S Osinski
(74) Attorney, Agent, or Firm — Birch, Stewart, Kolasch & Birch, LLP

(57) ABSTRACT

Disclosed is a mobile terminal. The mobile terminal may include a front camera obtaining a 2D face image of a user, a glance sensor tilted by a certain angle and disposed adjacent to the front camera to obtain metadata of the 2D face image, and a controller obtaining a distance between the glance sensor and the front camera, the distance enabling an area of an overlap region, where a first region representing a range photographable by the front camera overlaps a second region representing a range photographable by the glance sensor, to be the maximum.

15 Claims, 22 Drawing Sheets

(58) Field of Classification Search
CPC ........ G02B 27/1066; G02B 2027/0134; G02B 2027/0138
See application file for complete search history.

(56) References Cited

U.S. PATENT DOCUMENTS

| | | | | |
|---|---|---|---|---|
| 9,857,575 B2* | 1/2018 | Nunnink | | G02B 27/14 |
| 9,892,298 B2* | 2/2018 | Nunnink | | G06K 7/10722 |
| 10,117,569 B2* | 11/2018 | Shudo | | A61B 5/168 |
| 10,430,651 B2* | 10/2019 | Lee | | G06K 9/2036 |
| 2006/0215903 A1* | 9/2006 | Nishiyama | | G06K 9/32 |
| | | | | 382/154 |
| 2008/0056561 A1* | 3/2008 | Sawachi | | G06K 9/32 |
| | | | | 382/154 |
| 2008/0089557 A1* | 4/2008 | Iwaki | | G01S 13/931 |
| | | | | 382/106 |
| 2009/0060280 A1* | 3/2009 | Choi | | G06T 7/593 |
| | | | | 382/106 |
| 2009/0278658 A1* | 11/2009 | Higashiyama | | G06K 9/00604 |
| | | | | 340/5.82 |
| 2010/0265331 A1* | 10/2010 | Tanaka | | H04N 7/181 |
| | | | | 348/159 |
| 2012/0062707 A1* | 3/2012 | Seo | | H04N 13/239 |
| | | | | 348/47 |
| 2012/0257024 A1* | 10/2012 | Inaba | | H04N 13/239 |
| | | | | 348/49 |
| 2012/0293633 A1* | 11/2012 | Yamato | | G03B 35/10 |
| | | | | 348/47 |
| 2013/0201563 A1* | 8/2013 | Nunnink | | G02B 27/14 |
| | | | | 359/618 |
| 2013/0321580 A1* | 12/2013 | Chou | | H04N 13/271 |
| | | | | 348/46 |
| 2014/0160249 A1* | 6/2014 | Ro | | H04N 5/23296 |
| | | | | 348/47 |
| 2014/0168502 A1* | 6/2014 | Georgy | | G02B 7/285 |
| | | | | 348/349 |
| 2014/0294231 A1* | 10/2014 | Datta | | G06T 7/251 |
| | | | | 382/103 |
| 2014/0350338 A1* | 11/2014 | Tanaka | | A61B 1/00009 |
| | | | | 600/111 |
| 2015/0077523 A1* | 3/2015 | Sato | | H04N 13/106 |
| | | | | 348/49 |
| 2015/0130839 A1* | 5/2015 | Kasahara | | G06F 3/0304 |
| | | | | 345/633 |
| 2015/0193933 A1* | 7/2015 | Lim | | G01S 17/46 |
| | | | | 348/136 |
| 2015/0310621 A1* | 10/2015 | Matono | | H04N 13/271 |
| | | | | 348/47 |
| 2015/0319409 A1* | 11/2015 | Imamura | | G06T 7/593 |
| | | | | 348/135 |
| 2016/0050407 A1* | 2/2016 | Chen | | H04N 5/23212 |
| | | | | 348/47 |
| 2016/0117555 A1* | 4/2016 | Kuldkepp | | G06F 3/013 |
| | | | | 382/103 |
| 2016/0188936 A1* | 6/2016 | Nunnink | | G02B 26/12 |
| | | | | 235/462.22 |
| 2016/0212329 A1* | 7/2016 | Choe | | H04N 5/23222 |
| 2016/0216520 A1* | 7/2016 | Yajima | | G02B 27/0179 |
| 2016/0255331 A1* | 9/2016 | Atsumi | | G06K 9/00818 |
| | | | | 348/47 |
| 2016/0267339 A1* | 9/2016 | Nakano | | G06T 11/60 |
| 2017/0217370 A1* | 8/2017 | Yatsuri | | H04N 13/239 |
| 2018/0007282 A1* | 1/2018 | Sato | | G06K 9/0063 |
| 2018/0032813 A1 | 2/2018 | Lee | | |
| 2018/0049697 A1* | 2/2018 | Rousseau | | G06F 3/013 |
| 2018/0052457 A1* | 2/2018 | Kim | | H04N 13/296 |
| 2018/0096461 A1* | 4/2018 | Okayama | | G06T 7/10 |
| 2018/0098000 A1* | 4/2018 | Park | | H04N 5/23241 |
| 2018/0101737 A1* | 4/2018 | You | | G08G 1/166 |
| 2018/0108120 A1* | 4/2018 | Venable | | G01S 17/88 |
| 2018/0189975 A1* | 7/2018 | Inada | | G01C 3/08 |
| 2018/0231885 A1* | 8/2018 | Du | | G03B 35/08 |
| 2018/0249910 A1* | 9/2018 | Zhang | | A61B 5/0035 |
| 2019/0042842 A1* | 2/2019 | Cavin | | G06K 9/2027 |
| 2019/0087971 A1* | 3/2019 | Sano | | G06T 7/593 |

OTHER PUBLICATIONS

Karaoguz et al., "Online Adaptation of Gaze Fixation for a Stereo-Vergence System with Foveated Vision," International Conference on Advanced Robotics, 2009, XP031497344, 6 pages.

Willemse, "Object Tracking and Biomimetic Vergence Control for an Active Stereoscopic Vision System," Thesis for Bachelor of Science with Honours in Computer Science, Massey University, Jun. 24, 2012, XP055520998, 84 pages.

* cited by examiner

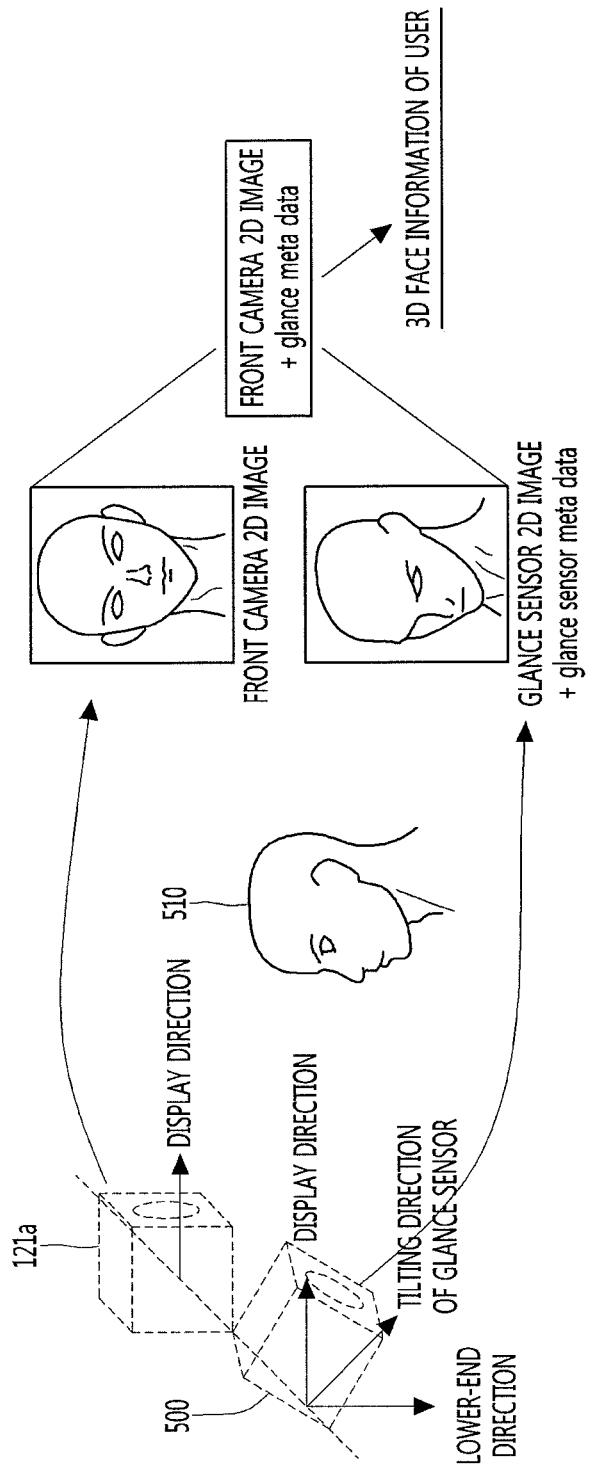

3D FACE INFORMATION REGISTRATION PROCESS

AUTHENTICATION PROCESS

FIG. 12A

※ FOV OF FRONT CAMERA: 120 DEGREES
※ FOV OF GLANCE SENSOR: 67 DEGREES
※ $D_{g\_max}$ AND $D_{c\_max}$ : 56.7cm
※ MAXIMUM DISTANCE OF D IS EQUAL TO OR LESS THAN 7.5cm (~75mm)

| SYMBOL | DESCRIPTION | VALUE (UNIT: DEGREE, cm) | VALUE (UNIT: RADIAN, mm) |
|---|---|---|---|
| $\theta\_c$ | FOV OF FRONT CAMERA | 120 | 2.097395102 |
| $\theta\_g$ | Glance FOV | 67 | 1.169370599 |
| $D\_t$ | TILTING ANGLE OF GLANCE SENSOR | 5 | 0.087266463 |
| $D\_c$ | DISTANCE BETWEEN FRONT CAMERA AND USER | 56.7< | 567< |
| $D\_g$ | DISTANCE BETWEEN GLANCE SENSOR AND USER | 56.7< | 567< |
| $D\_{c\_max}$ | MAXIMUM DISTANCE OF FRONT CAMERA | 56.7 | 567 |
| $D\_{g\_max}$ | MAXIMUM DISTANCE OF GLANCE SENSOR | 56.7 | 567 |
| d | DISTANCE BETWEEN FRONT CAMERA AND GLANCE SENSOR | OPTIMAL VALUE SELECTION | OPTIMAL VALUE SELECTION |

FIG. 12B

| d | ORIGINAL POINT(O) | | A1 POINT | | B1 POINT | |
|---|---|---|---|---|---|---|
| | x | y | x1 | y1 | x2 | y2 |
| All | 0 | 0 | 567 | 982.07 | 567 | -982.07 |

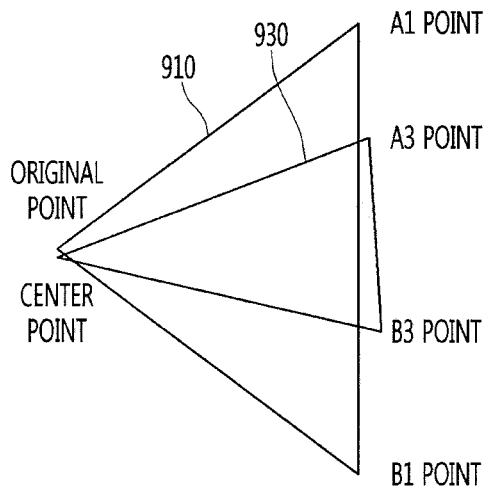

FIG. 12C

| d | CENTER POINT | | A3 POINT | | B3 POINT | | AREA OF OVERLAP REGION |
|---|---|---|---|---|---|---|---|
| | X coordinate | Y coordinate | X coordinate | Y coordinate | X coordinate | Y coordinate | |
| 5 | 0 | -5 | 532.1337924 | 418.278331 | 597.5509952 | -329.4437187 | 96656.42 |
| 10 | 0 | -10 | 532.1337924 | 413.278331 | 597.5509952 | -334.4437187 | 125450.7 |
| 15 | 0 | -15 | 532.1337924 | 408.278331 | 597.5509952 | -339.4437187 | 99182.6 |
| 20 | 0 | -20 | 532.1337924 | 403.278331 | 597.5509952 | -344.4437187 | 100442.4 |
| 25 | 0 | -25 | 532.1337924 | 398.278331 | 597.5509952 | -349.4437187 | 101700 |
| 30 | 0 | -30 | 532.1337924 | 393.278331 | 597.5509952 | -354.4437187 | 102955.5 |
| 35 | 0 | -35 | 532.1337924 | 388.278331 | 597.5509952 | -359.4437187 | 104208.7 |
| 40 | 0 | -40 | 532.1337924 | 383.278331 | 597.5509952 | -364.4437187 | 86386.45 |
| 45 | 0 | -45 | 532.1337924 | 378.278331 | 597.5509952 | -369.4437187 | 111907.1 |
| 50 | 0 | -50 | 532.1337924 | 373.278331 | 597.5509952 | -374.4437187 | 134487.5 |
| 55 | 0 | -55 | 532.1337924 | 368.278331 | 597.5509952 | -379.4437187 | 135608.6 |
| 60 | 0 | -60 | 532.1337924 | 363.278331 | 597.5509952 | -384.4437187 | 123267.7 |
| 65 | 0 | -65 | 532.1337924 | 358.278331 | 597.5509952 | -389.4437187 | 106850.8 |

FIG. 13A

※ FOV OF FRONT CAMERA: 120 DEGREES
※ FOV OF GLANCE SENSOR: 67 DEGREES
※ $D_{g\_max}$ AND $D_{c\_max}$ : 56.7cm
※ MAXIMUM DISTANCE OF D IS EQUAL TO OR LESS THAN 7.5cm (~75mm)
※ $D_{g\_max}$ AND $D_{c\_max}$ : 56.7cm

| SYMBOL | DESCRIPTION | VALUE (UNIT: DEGREE, cm) | VALUE (UNIT: RADIAN, mm) |
|---|---|---|---|
| $\theta_{\_c}$ | FOV OF FRONT CAMERA | 120 | 2.094395102 |
| $\theta_{\_g}$ | Glance FOV | 67 | 1.169370599 |
| $D_{\_t}$ | TILTING ANGLE OF GLANCE SENSOR | 50 | 0.872664626 |
| $D_{\_c}$ | DISTANCE BETWEEN FRONT CAMERA AND USER | 56.7< | 567< |
| $D_{\_g}$ | DISTANCE BETWEEN GLANCE SENSOR AND USER | 56.7< | 567< |
| $D_{\_c\_max}$ | MAXIMUM DISTANCE OF FRONT CAMERA | 56.7 | 567 |
| $D_{\_g\_max}$ | MAXIMUM DISTANCE OF GLANCE SENSOR | 56.7 | 567 |
| d | DISTANCE BETWEEN FRONT CAMERA AND GLANCE SENSOR | OPTIMAL VALUE SELECTION | OPTIMAL VALUE SELECTION |

| d | ORIGINAL POINT(O) | | A1 POINT | | B1 POINT | |
|---|---|---|---|---|---|---|
| | x | y | x1 | y1 | x2 | y2 |
| All | 0 | 0 | 567 | 982.07 | 567 | -982.07 |

FIG. 13C

| d | CENTER POINT | | A3 POINT | | B3 POINT | | AREA OF OVERLAP REGION |
|---|---|---|---|---|---|---|---|
| | X coordinate | Y coordinate | X coordinate | Y coordinate | X coordinate | Y coordinate | |
| 5 | 0 | -5 | 76.97243496 | 670.5783913 | 651.9487144 | 188.1160072 | 1.46E-11 |
| 10 | 0 | -10 | 76.97243496 | 665.5783913 | 651.9487144 | 183.1160072 | 0 |
| 15 | 0 | -15 | 76.97243496 | 660.5783913 | 651.9487144 | 178.1160072 | 0 |
| 20 | 0 | -20 | 76.97243496 | 655.5783913 | 651.9487144 | 173.1160072 | 0 |
| 25 | 0 | -25 | 76.97243496 | 650.5783913 | 651.9487144 | 168.1160072 | 1.46E-11 |
| 30 | 0 | -30 | 76.97243496 | 645.5783913 | 651.9487144 | 163.1160072 | 0 |
| 35 | 0 | -35 | 76.97243496 | 640.5783913 | 651.9487144 | 158.1160072 | 8197.246 |
| 40 | 0 | -40 | 76.97243496 | 635.5783913 | 651.9487144 | 153.1160072 | 1.46E-11 |
| 45 | 0 | -45 | 76.97243496 | 630.5783913 | 651.9487144 | 148.1160072 | 12579.72 |
| 50 | 0 | -50 | 76.97243496 | 625.5783913 | 651.9487144 | 143.1160072 | 1.46E-11 |
| 55 | 0 | -55 | 76.97243496 | 620.5783913 | 651.9487144 | 138.1160072 | 15378.22 |
| 60 | 0 | -60 | 76.97243496 | 615.5783913 | 651.9487144 | 133.1160072 | 0 |
| 65 | 0 | -65 | 76.97243496 | 610.5783913 | 651.9487144 | 128.1160072 | 0 |

FIG. 14A

※ FOV OF FRONT CAMERA: 120 DEGREES
※ FOV OF GLANCE SENSOR: 67 DEGREES
※ $D_{g\_max}$ AND $D_{c\_max}$ : 56.7cm
※ MAXIMUM DISTANCE OF D IS EQUAL TO OR LESS THAN 7.5cm (~75mm)
※ $D_{g\_max}$ AND $D_{c\_max}$ : 56.7cm

| SYMBOL | DESCRIPTION | VALUE (UNIT: DEGREE, cm) | VALUE (UNIT: RADIAN, mm) |
|---|---|---|---|
| $\theta_{\_c}$ | FOV OF FRONT CAMERA | 120 | 2.094395102 |
| $\theta_{\_g}$ | Glance FOV | 67 | 1.169370599 |
| $D_{\_t}$ | TILTING ANGLE OF GLANCE SENSOR | 10 | 0.872664626 |
| $D_{\_c}$ | DISTANCE BETWEEN FRONT CAMERA AND USER | 56.7< | 567< |
| $D_{\_g}$ | DISTANCE BETWEEN GLANCE SENSOR AND USER | 56.7< | 567< |
| $D_{\_c\_max}$ | MAXIMUM DISTANCE OF FRONT CAMERA | 56.7 | 567 |
| $D_{\_g\_max}$ | MAXIMUM DISTANCE OF GLANCE SENSOR | 56.7 | 567 |
| d | DISTANCE BETWEEN FRONT CAMERA AND GLANCE SENSOR | OPTIMAL VALUE SELECTION | OPTIMAL VALUE SELECTION |

| d | ORIGINAL POINT(O) | | A1 POINT | | B1 POINT | |
|---|---|---|---|---|---|---|
| | x | y | x1 | y1 | x2 | y2 |
| All | 0 | 0 | 567 | 982.07 | 567 | -982.07 |

| d | CENTER POINT | | A3 POINT | | B3 POINT | | AREA OF OVERLAP REGION |
|---|---|---|---|---|---|---|---|
| | X coordinate | Y coordinate | X coordinate | Y coordinate | X coordinate | Y coordinate | |
| 5 | 0 | -5 | 493.2177254 | 463.046145 | 623.5542666 | -276.1291116 | 71704.56 |
| 10 | 0 | -10 | 493.2177254 | 458.046145 | 623.5542666 | -281.1291116 | 87111.01 |
| 15 | 0 | -15 | 493.2177254 | 453.046145 | 623.5542666 | -286.1291116 | 67422.3 |
| 20 | 0 | -20 | 493.2177254 | 448.046145 | 623.5542666 | -291.1291116 | 75108.9 |
| 25 | 0 | -25 | 493.2177254 | 443.046145 | 623.5542666 | -296.1291116 | 76234.87 |
| 30 | 0 | -30 | 493.2177254 | 438.046145 | 623.5542666 | -301.1291116 | 64243.96 |
| 35 | 0 | -35 | 493.2177254 | 433.046145 | 623.5542666 | -306.1291116 | 71071.53 |
| 40 | 0 | -40 | 493.2177254 | 428.046145 | 623.5542666 | -311.1291116 | 92842.87 |
| 45 | 0 | -45 | 493.2177254 | 423.046145 | 623.5542666 | -316.1291116 | 71177.74 |
| 50 | 0 | -50 | 493.2177254 | 418.046145 | 623.5542666 | -321.1291116 | 72872.35 |
| 55 | 0 | -55 | 493.2177254 | 413.046145 | 623.5542666 | -326.1291116 | 58858.57 |
| 60 | 0 | -60 | 493.2177254 | 408.046145 | 623.5542666 | -331.1291116 | 57768.27 |
| 65 | 0 | -65 | 493.2177254 | 403.046145 | 623.5542666 | -336.1291116 | 56673.56 |

DIAGONAL LENGTH = $\sqrt{0.3^2 + 0.3^2 + 0.2^2} = \sqrt{0.22} \cong 0.469$

Tilted by 60 degrees in 4mm direction

Step1:
= 4 mm * sin 60 degrees
= 4 mm * (Root 3) / 2
= 4 * 0.866
= 3.464

Step2:
= 2.5 mm * cos 60 degrees
= 2.5 mm * 1 / 2
= 2.5 * 0.5
= 1.25

Step3: step1 + step2
= 3.464 + 1.25
= 4.714

Tilted by 60 degrees in 3.6mm direction

Step1:
= 3.6 mm * sin 60 degrees
= 3.6 mm * (Root 3) / 2
= 3.6 * 0.866
= 3.117

Step2:
= 2.5 mm * cos 60 degrees
= 2.5 mm * 1 / 2
= 2.5 * 0.5
= 1.25

Step3: step1 + step2
= 3.117 + 1.25
= 4.3

MOBILE TERMINAL PROVIDING FACE RECOGNITION USING GLANCE SENSOR

CROSS-REFERENCE TO RELATED APPLICATIONS

This application claims priority under 35 U.S.C. 119 and 365 to Korean Patent Application No. 10-2017-0097533, filed on Aug. 1, 2017 in the Korean Intellectual Property Office, the disclosure of which is incorporated herein by reference.

BACKGROUND

Field of the Invention

The present invention relates to a mobile terminal, and more particularly, to a mobile terminal for providing a face recognition service by using a glance sensor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

Recently, user authentication is performed by using face recognition technology, for security of a person.

In the face recognition technology, user authentication may be naturally performed in a non-contact manner without requiring a special gesture or action of a user.

Examples of the face recognition technology include a technique which performs face recognition by using a skin color of a face, a face recognition technique based on induction of a specific action, and a technique which uses an image captured by a camera and a microphone receiving a voice uttered by a user.

However, the technique using a skin color of a face has a problem where a recognition rate is reduced when various skin colors and a lighting condition are changed.

Moreover, in the technique which induces a user to make a specific action of a user such as a winking action or a smiling action while photographing a video for face recognition, since the user is recognized through a real-time action of the user, security against a spurious photograph is high, but since a specific action of the user can be recorded, security is vulnerable. Also, in such a technique, since the user should make a specific action, convenience is reduced.

Moreover, in the technique which recognizes a face and a voice of a person by using a camera and a microphone, power consumption is high, and a voice recognition rate is reduced by external noise. Also, since a user should utter a voice, inconvenience of the user occurs.

SUMMARY

Accordingly, an object of the present invention is to address the above-noted and other problems.

An aspect of the present invention is directed to provide a mobile terminal which, by using metadata of a face image obtained through a front camera and a face image obtained through a glance sensor, reinforces a security of user authentication based on face recognition and increases convenience.

Another aspect of the present invention is directed to provide a method which calculates an optimal disposition of a glance sensor with respect to a front camera so as to efficiently perform user authentication.

A mobile terminal according to an embodiment of the present invention includes a front camera obtaining a two-dimensional (2D) face image of a user, a glance sensor tilted by a certain angle and disposed adjacent to the front camera to obtain metadata of the 2D face image, and a controller obtaining a distance between the glance sensor and the front camera, the distance enabling an area of an overlap region, where a first region representing a range photographable by the front camera overlaps a second region representing a range photographable by the glance sensor, to be the maximum.

According to an embodiment of the present invention, by using metadata of a face image which is obtained through a glance sensor and is extracted and changed in real time, security is reinforced when performing user authentication through face recognition.

Moreover, according to an embodiment of the present invention, user authentication is conveniently performed through only an action of gazing at a front camera without user's making an additional action.

Moreover, according to an embodiment of the present invention, an optimal disposition of a glance sensor is obtained, and thus, user authentication based on face recognition is more quickly and accurately performed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5B is a diagram for describing a process of generating three-dimensional (3D) face information of a user by using a front camera and a glance sensor;

FIGS. 8 to 14C are diagrams for describing a process of calculating a tilting angle of a glance sensor and a distance from the glance sensor to a front camera by using relevant factors for determining an optimal disposition of the glance sensor according to an embodiment of the present invention; and FIGS. 15A to 15C are diagrams for describing a thickness of a glance sensor equipped in a tilted state.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
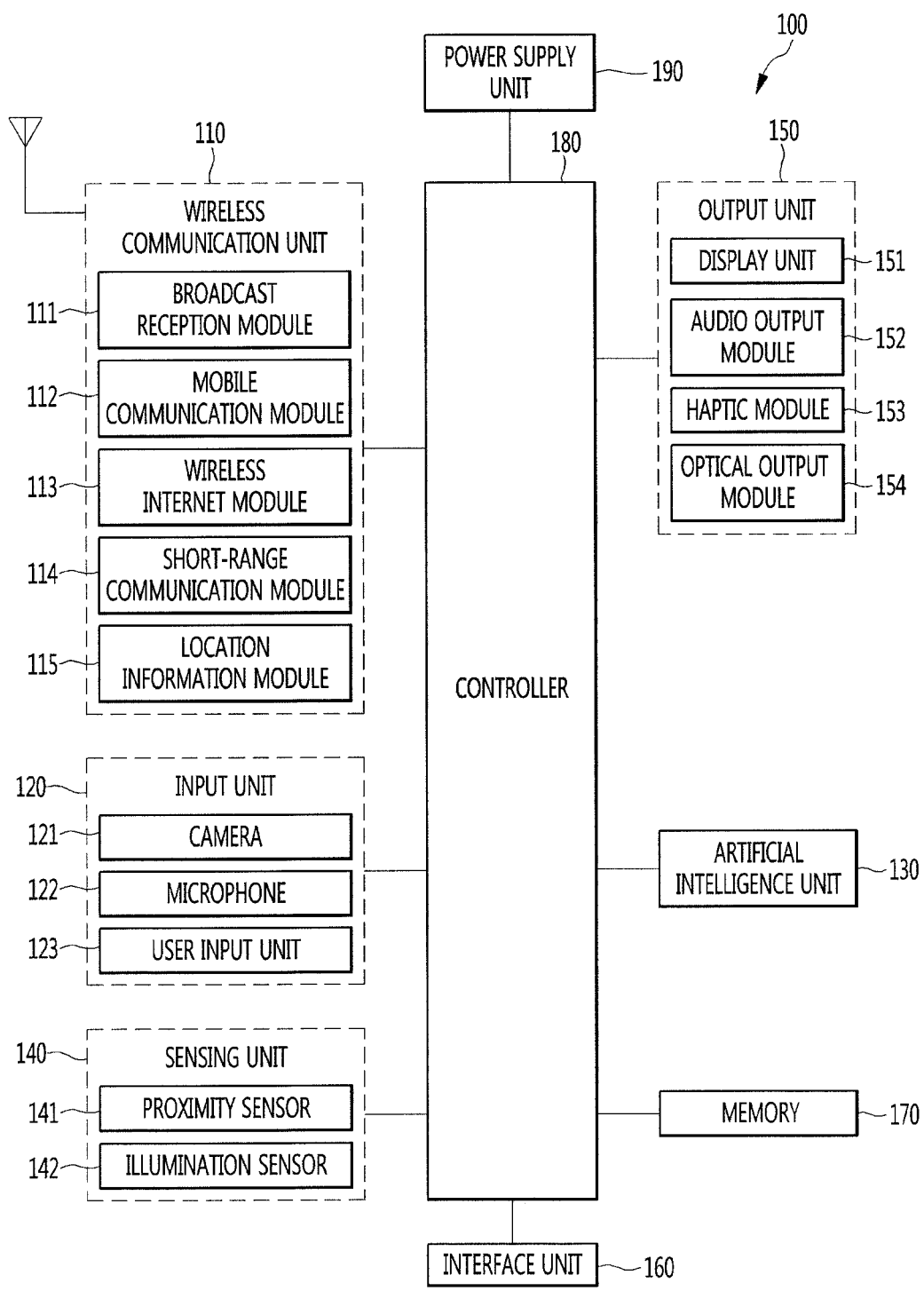
FIG. 1A is a block diagram of a mobile terminal in accordance with the present disclosure.
Figure 1B:
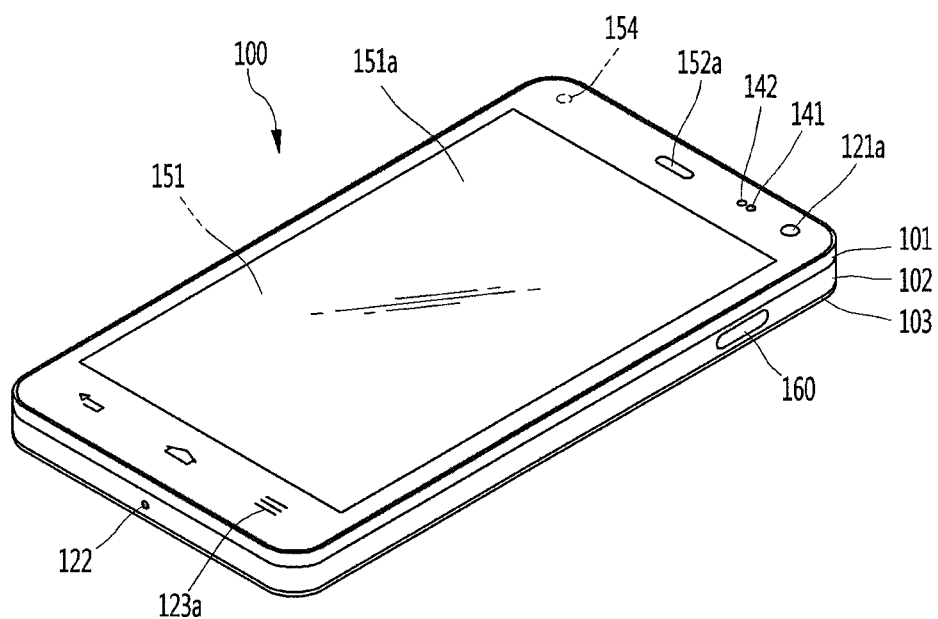
FIGS. 1B and 1C are conceptual views of one example of the mobile terminal, viewed from different directions.
Figure 1C:
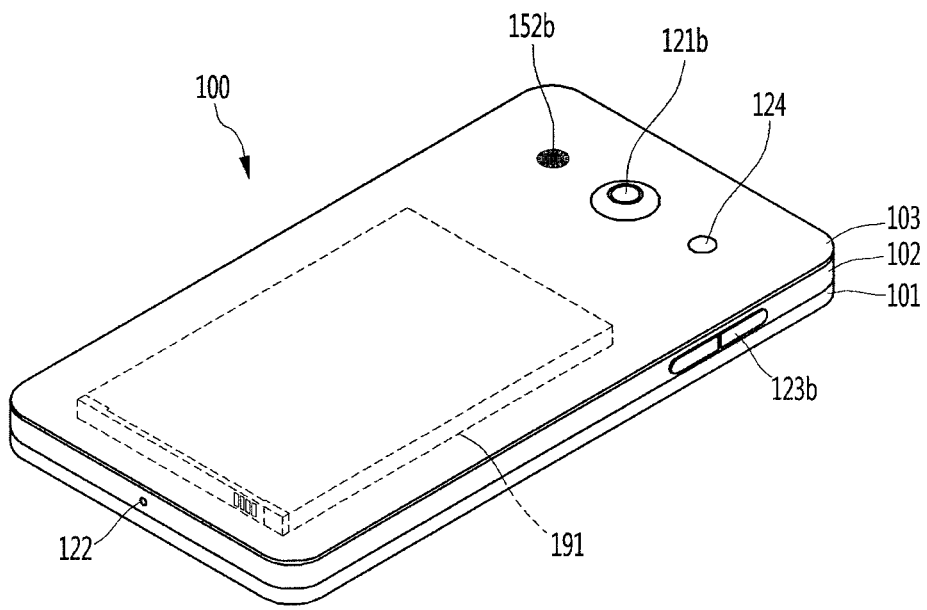

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, an artificial intelligence unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The artificial intelligence unit 130 serves to process information based on artificial intelligence technology and may include one or more modules for performing at least one of information learning, information inference, information perception or natural language processing.

The artificial intelligence unit 130 may perform at least one of learning, inference or processing of an enormous amount of information (big data) such as information stored in the mobile terminal, surrounding environmental information of the mobile terminal or information stored in an external storage capable of performing communication using machine learning technology. The artificial intelligence unit 130 may control the mobile terminal to predict (or infer) operation of at least one executable mobile terminal and to perform operation having highest feasibility among one or more predicted operations using information learned using machine learning technology.

Machine learning technology refers to technology for collecting and learning an enormous amount of information based on at least one algorithm and determining and predicting information based on the learned information. Information learning refers to operations for checking features, rules, judgement criteria, etc., of information, quantizing a relation between information and information and predicting new data using the quantized pattern.

An algorithm using such machine learning technology may be based on statistics and may include, for example, a decision tree using a tree structure as a prediction model, a neural network for emulating the neural network structures and functions of living things, genetic programming based on evolutionary algorithms, clustering for dividing observed examples into subsets such as clusters, a Monte Carlo method of stochastically calculating a function value repeated random sampling, etc.

Deep learning technology as machine learning technology refers to technology of performing at least one of information learning, judgement and processing using an artificial neural network. The artificial neural network may have a structure for connecting nodes and delivering data between nodes. Such deep learning technology may learn an enormous amount of information through an artificial neural network using an optimized graphics processing unit (GPU) optimized for parallel arithmetic.

Meanwhile, the artificial intelligence unit 130 may collect (sense, monitor, extract, detect, or receive) signals, data, information, etc. input to or output from components of the mobile terminal, in order to collect an enormous amount of information for applying machine learning technology. In addition, the artificial intelligence unit 130 may collect (sense, monitor, extract, detect or receive) data, information, etc. stored in an external storage (e.g., a cloud server). More specifically, information collection may be understood as including operation for sensing information through a sensor, extracting information stored in the memory 170 or receiving information from the external storage through communication.

The artificial intelligence unit 130 may sense internal information of the mobile terminal, surrounding environmental information of the mobile terminal and user information through the sensing unit 140. In addition, the artificial intelligence unit 130 may receive broadcast signals and/or broadcast related information, wireless signals, wireless data, etc. through the wireless communication unit 110.

In addition, the artificial intelligence unit 130 may receive video information (or signal), audio signal (or signal), data or user input information from the input unit.

The artificial intelligence unit 130 may collect an enormous amount of information on the background in real time, learn the information, process the information into an appropriate format (e.g., a knowledge graph, a command policy, a personalization database, a dialog engine, etc.), and store the processed information in the memory 170.

The artificial intelligence unit 130 may predict operation of the mobile terminal based on information learned using machine learning technology, control the components of the mobile terminal in order to perform the predicted operation or deliver a control command for performing the predicted operation to the controller 180. The controller 180 may control the mobile terminal based on the control command to perform the predicted operation.

When specific operation is performed, the artificial intelligence unit 130 may analyze history information indicating the performed specific operation through machine learning technology and update previously learned information based on the analyzed information. The artificial intelligence unit 130 may improve information prediction accuracy.

Meanwhile, in this specification, the artificial intelligence unit 130 and the controller 180 may be understood as the same component. In this case, the function performed by the controller 180 described in this specification may be described as being performed by the artificial intelligence unit 130. The controller 180 may be referred to as the artificial intelligence unit 130 or the artificial intelligence unit 130 may be referred to as the controller 180.

In contrast, in this specification, the artificial intelligence unit 130 and the controller 180 may be understood as different components. In this case, the artificial intelligence unit 130 and the controller 180 may exchange data with each other to perform a variety of control on the mobile terminal. The controller 180 may perform at least one function on the mobile terminal and control at least one of the components of the mobile terminal, based on the result derived from the artificial intelligence unit 130. Further, the artificial intelligence unit 130 may operate under control of the controller 180.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
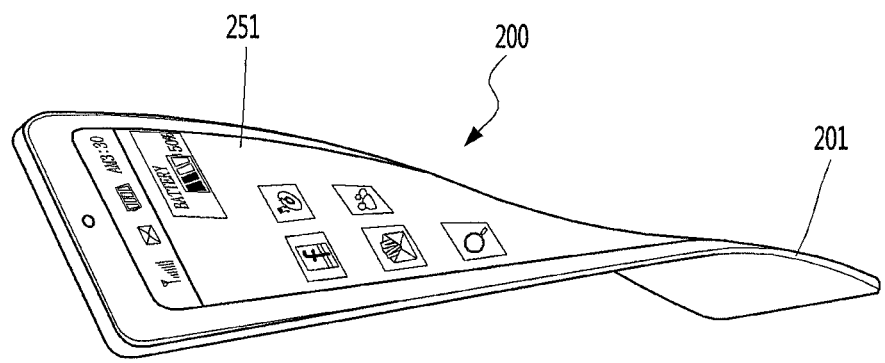
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
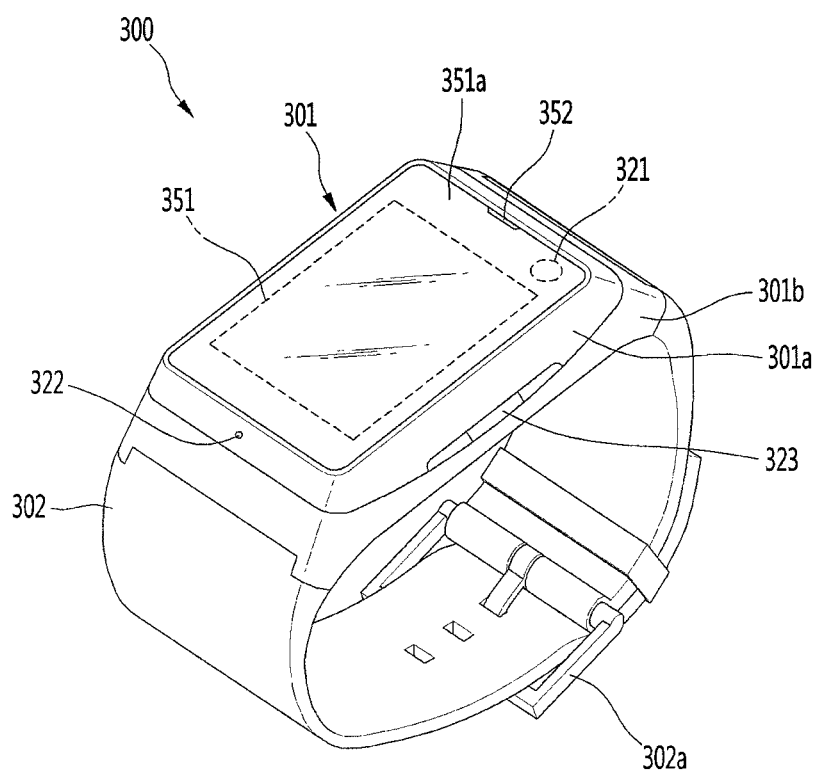
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
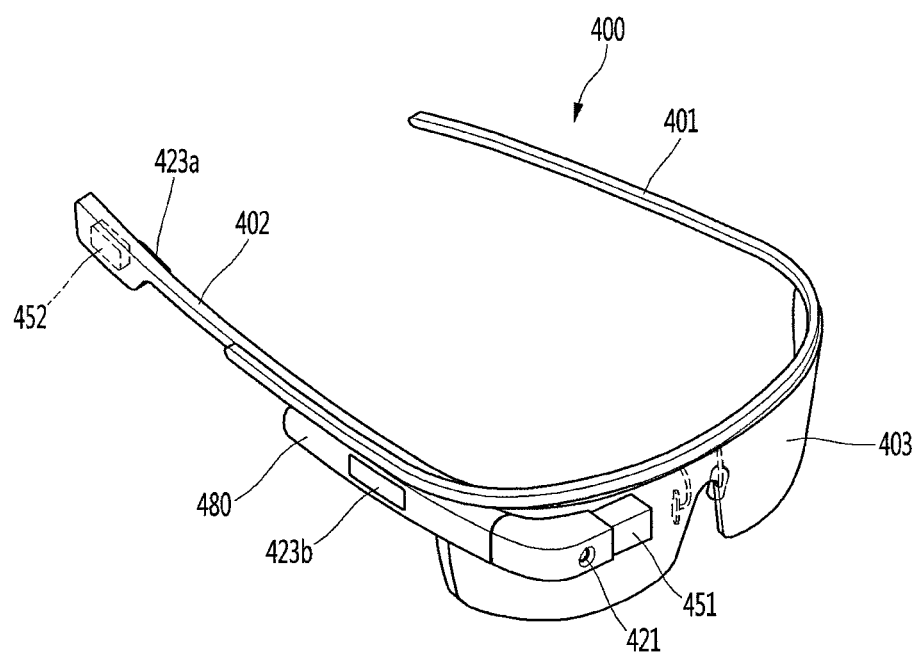
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Hereinafter, a method of performing user authentication by using a front camera and a glance sensor provided in a mobile terminal and a disposition structure of the front camera and the glance sensor will be described in detail.

Figure 5A:
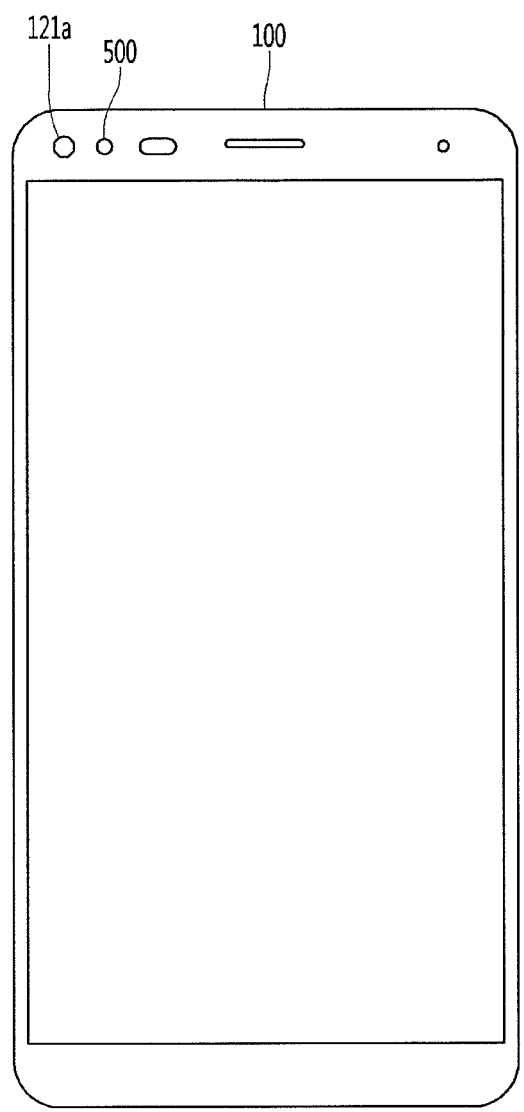
FIG. 5A is a diagram for describing a disposition state of a front camera and a glance sensor according to an embodiment of the present invention.

FIG. 5A is a diagram for describing a disposition state of a front camera and a glance sensor according to an embodiment of the present invention, and FIG. 5B is a diagram for describing a process of generating 3D face information of a user by using a front camera and a glance sensor.

Figure 5C:
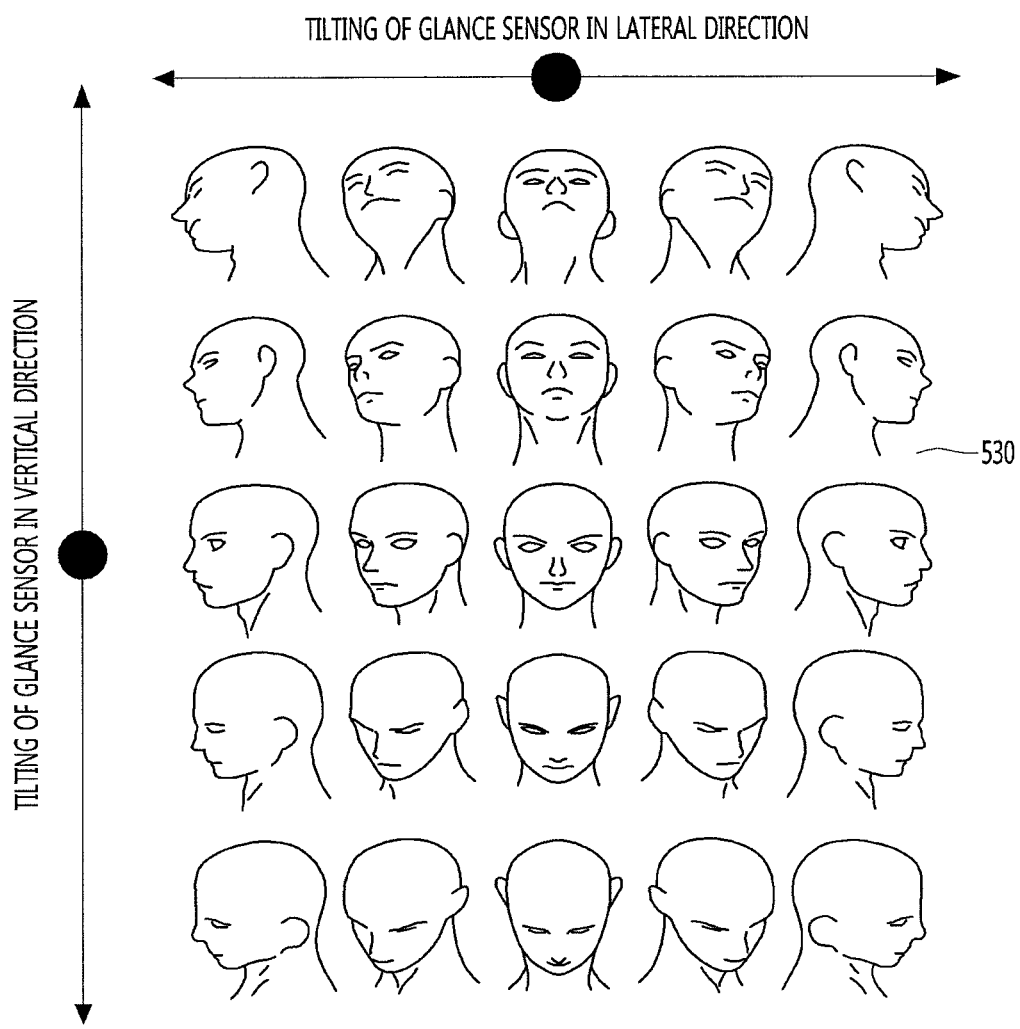
FIG. 5C illustrates an example of a face image obtained through a glance sensor according to tilting of the glance sensor.

Moreover, FIG. 5C illustrates an example of a face image obtained through a glance sensor according to tilting of the glance sensor.

Referring to FIG. 5A, a front camera 121a and a glance sensor 500 may be disposed in an upper end of the mobile terminal 100, but this is merely an exemplary disposition.

The front camera 121a and the glance sensor 500 may be disposed adjacent to each other.

The front camera 121a and the glance sensor 500, as described above with reference to FIG. 1B, may be disposed in an internal space which is provided by coupling a front case to a rear case.

A disposition relationship between the front camera 121a and the glance sensor 500 will be described below in detail.

Referring to FIG. 5B, a process of generating 3D face information of a user based on a two-dimensional (2D) image obtained by each of the front camera 121a and the glance sensor 500 is illustrated.

In FIG. 5B, a display direction may represent an upper vertical direction with respect to a surface on which a screen of the display unit is provided.

The front camera 121a may obtain a first face image of a user 510 who is located in the display direction. The first face image may be a 2D image.

The glance sensor 500 may perform an always on camera function which is performed with a low power. That is, the glance sensor 500 may be always activated with a low power, and thus, may have a function of a camera capable of obtaining a front image.

The glance sensor 500 may include a lens, an infrared (IR) filter, and an image sensor.

The lens of the glance sensor 500 may collect light incident from the outside.

The IR filter of the glance sensor 500 may filter IR light of the collected light.

The image sensor may convert the filter IR light into an electrical signal. Subsequently, the electrical signal may undergo an image processing operation and may be output to the display unit 151 or the controller 180.

The glance sensor 500 may be tilted by a certain angle in a lower-end direction with respect to the display direction and disposed. The tilted angle may be fixed angle. An optimized tilting angle will be described below in association with the front camera 121a.

The glance sensor 500 may be a sensor which obtains a front image and obtains metadata of the obtained image.

In detail, the glance sensor 500 may obtain a second face image for obtaining metadata of a face of a user. The second face image may also be a 2D image.

The glance sensor 500 may be a sensor which, by using the always on camera function, detects a face and extracts metadata of the face in real time.

The controller 180 may extract metadata from the second face image obtained by the glance sensor 500.

In an embodiment, the metadata may include one or more of a direction of the face, an angle of the face, a size of the face, a location of the face, illumination when the second face image is obtained, and a distance between the glance sensor 500 and the face of the user.

The controller 180 may generate 3D face information by using the first face image obtained by the front camera 121a and the metadata obtained from the glance sensor 500.

Referring to FIG. 5C, an example of a face image set 530 which is obtained by the glance sensor 500 through tilting of the glance sensor 500 in a lateral direction or a vertical direction is shown.

The abscissa axis may be an axis showing that the glance sensor 500 is tilted in the lateral direction, and the ordinate axis may be an axis showing that the glance sensor 500 is tilted in the vertical direction.

Information about the direction of the face of the user and the tilting angle of the face of the user may be obtained according to tilting of the glance sensor 500.

In addition, the glance sensor 500 may obtain illumination of when the face image of the user is captured and the distance between the glance sensor 500 and the face of the user.

Hereinafter, a method of registering 3D face information for user authentication to perform an authentication process by using the front camera 121a and the glance sensor 500 will be described.

Figure 6A:
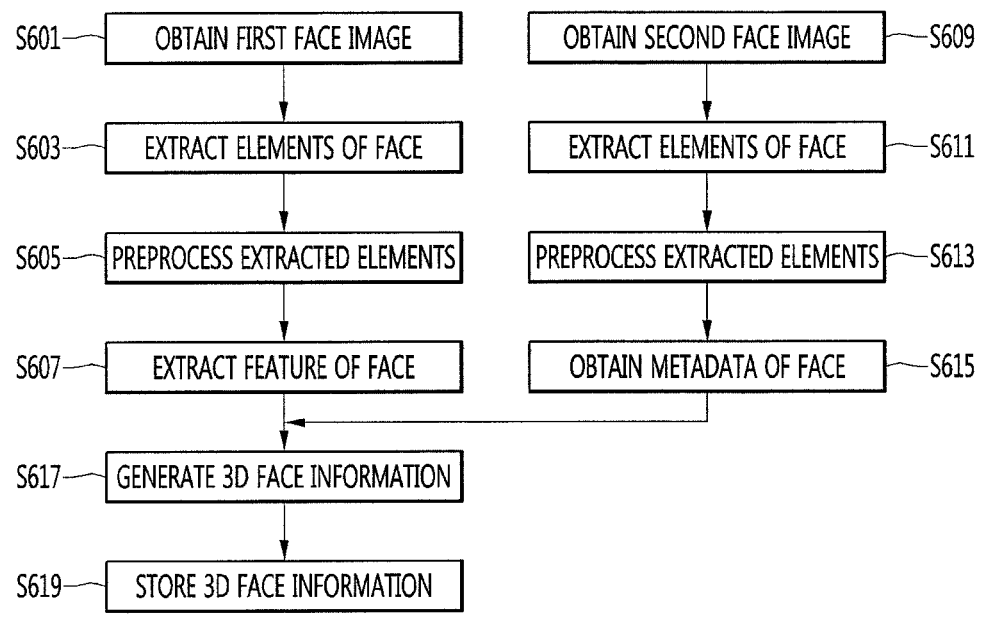
FIGS. 6A to 6C are diagrams for describing a process of generating 3D face information according to an embodiment of the present invention.
Figure 6B:
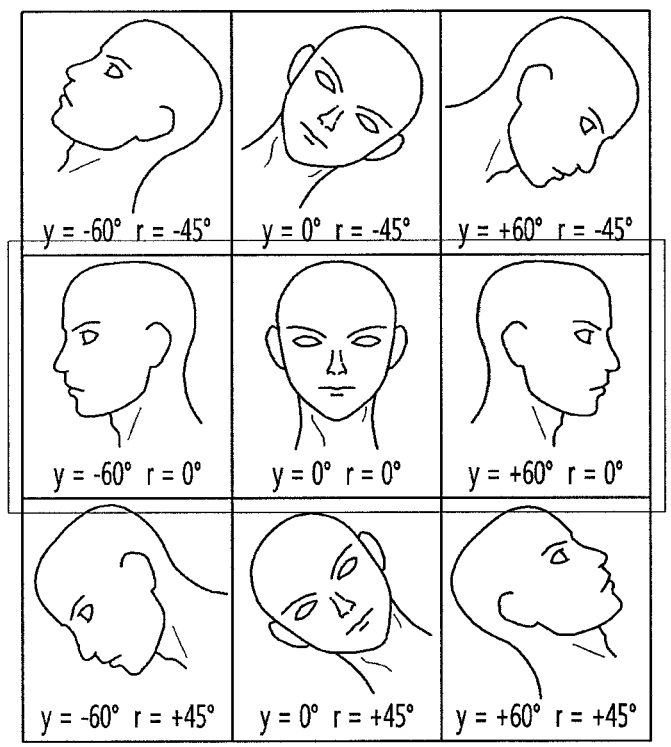
Figure 6C:
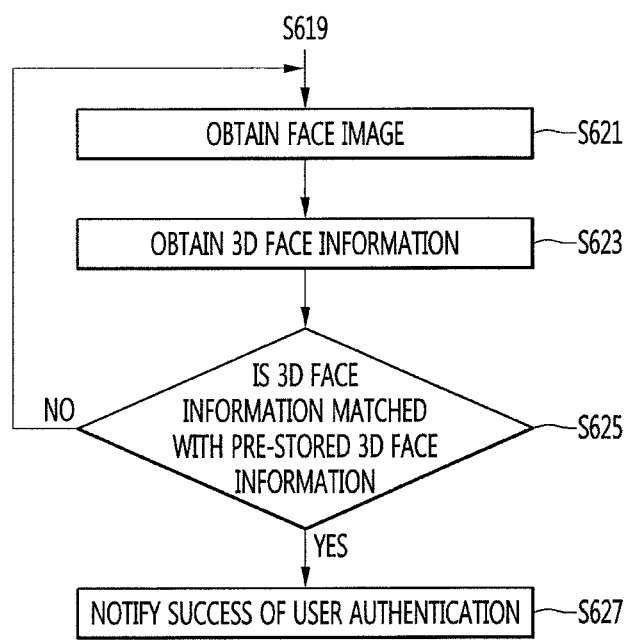

FIGS. 6A to 6C are diagrams for describing a process of generating 3D face information according to an embodiment of the present invention.

Particularly, FIG. 6A is a diagram for describing a process of registering 3D face information of a user by using the front camera 121a and the glance sensor 500, FIG. 6B is a diagram for describing a process of obtaining an angle of a face obtained by the glance sensor 500 according to an embodiment of the present invention, and FIG. 6C is a flowchart for describing a user authentication process by using the front camera 121a and the glance sensor 500.

First, FIG. 6A will be described.

The front camera 121a of the mobile terminal 100 may obtain a first face image of a user in operation S601.

When a user authentication request is received, the controller 180 may activate an operation of the front camera 121a, and the front camera 121a may capture a front image. The front image may include the first face image of the user.

The first face image may be a 2D image.

The controller 180 of the mobile terminal 100 may extract elements of the face from the obtained first face image in operation S603.

The controller 180 may extract the first face image from an image obtained through the front camera 121a and may extract a plurality of face elements from the extracted first face image.

The plurality of face elements may include eyes, a nose, a mouth, eyebrows, and a forehead.

In operation S605, the controller 180 of the mobile terminal 100 may preprocess the extracted face elements.

In an embodiment, a face element preprocessing process may include a process of adjusting, to predetermined lighting brightness, lighting brightness of when the first face image is captured.

Moreover, the face element preprocessing process may include a process of rotating the first face image so as to face a front.

In operation S607, the controller 180 of the mobile terminal 100 may extract face features based on a result of the preprocessing.

The controller 180 may extract a plurality of feature points for obtaining a contour of a face element from each of the preprocessed face elements. Each of the plurality of feature points may be a face feature.

In operation S609, the glance sensor 500 of the mobile terminal 100 may obtain a second face image of the user.

Operation S609 may be performed simultaneously with operation S601. That is, the controller 180 may simultaneously obtain the first face image and the second face image through the front camera 121a and the glance sensor 500.

In operation S611, the glance sensor 500 of the mobile terminal 100 may extract face elements from the obtained second face image.

The description of operation S605 may be applied to a detailed description of operation S611.

Also, it may be assumed that the glance sensor 500 is disposed at a location at which an area of a region, where a first region capable of being captured by the front camera 121a overlaps a second region capable of being captured by the glance sensor 500, is the maximum. An algorithm for selecting an optimal disposition location of the glance sensor 500 will be described below.

In operation S613, the glance sensor 500 of the mobile terminal 100 may preprocess the extracted face elements.

The description of operation S607 may be applied to a detailed description of operation S613.

It is described that operations S609 to S613 are performed by the glance sensor 500, but the present embodiment is not limited thereto. In other embodiments, operations S609 to S613 are performed by the controller 180.

In operation S615, the glance sensor 500 of the mobile terminal 100 may obtain metadata of the face based on the preprocessing result.

In an embodiment, the metadata of the face may include one or more of the direction of the face, the angle of the face, the size of the face, the location of the face, illumination when the second face image is obtained, the distance between the glance sensor 500 and the face of the user, and the number of faces.

The direction of the face may represent which of a front side, a left side, a right side, an upper side, and a lower side the face faces.

The angle of the face may be an angle representing in which of a pitch, a roll, and a yaw the face is rotated with respect to the front of the face.

A process of obtaining an angle of a face will be described with reference to FIG. 6B.

Referring to FIG. 6B, the glance sensor 500 may sense an angle of a face of a user.

In detailed, when a pitch is fixed, the glance sensor 500 may sense a yaw angle "y" and a roll angle "r" which are angles by which the face of the user are rotated with respect to a specific axis.

The controller 180 may store a plurality of face angles of FIG. 6B in the memory 170 in order for the plurality of face angles to be respectively mapped to a plurality of face images.

That is, the sensed yaw angle "y" and roll angle "r" may be mapped to a face image obtained by the front camera 121a and may be stored as 3D face information in the memory 170.

The glance sensor 500 may be equipped in an upper end of the mobile terminal with being tilted.

When the mobile terminal 500 is tilted by an external physical force, metadata of a face sensed by the glance sensor 500 may be changed.

The controller 180 may store metadata of a face image, corresponding to various cases based on a tilting angle of the mobile terminal 100, in the memory 170.

FIG. 6A will be described again.

A size of a face may be expressed as a height and a width of the face.

A location of the face may be expressed based on x and y coordinates of a screen of the display unit 151.

In the metadata of the face, the size of the face, the location of the face, and a direction of the face may be obtained from the first face image captured through the front camera 121a.

In operation S617, the controller 180 may generate 3D face information of the user, based on the face features extracted from the first face image and the metadata obtained from the second face image.

The 3D face information may be a 3D face image which is generated based on the 2D face image and the metadata of the face image.

That is, the controller 180 may generate the 3D face information by using the 2D face image and the metadata of the face image even without obtaining the 3D face image.

In an embodiment, the controller 180 may generate the 3D face information of the user by using machine learning technology. In this case, instead of the controller 180, the artificial intelligence unit 130 may generate the 3D face information.

First, when the user gazes at the front camera 121a, the controller 180 may obtain the first face image of the user through the front camera 121a. The obtained first face image of the user may be a front image which faces a front.

Simultaneously, the glance sensor 500 which is equipped with being tilted may obtain the second face image of the user. Also, the glance sensor 500 may obtain a location and a size of the second face image.

The location of the second face image may be calculated based on x and y coordinates of the screen, and the size of the second face image may be an area which is obtained by using a width and a height calculated based the x and y coordinates.

When the mobile terminal 500 is tilted by a certain angle with respect to the pitch, the glance sensor 500 may sense a tilting angle of the user face image.

The controller 180 may store the user face image in order for the user face image to be mapped to the sensed tilting angle. Such a process may be repeated on a plurality of tilting angles.

The controller 180 may perform the above-described operation on a roll direction a yaw direction.

Therefore, the controller 180 may match the user face image with an angle which is tilted in at least one direction of the pitch, the roll, and the yaw, thereby generating 3D face information.

In operation S619, the controller 180 may store the generated 3D face information of the user in the memory 170.

In an embodiment, the controller 180 may store the 3D face information of the user in the memory 170 as information for an authentication process.

FIG. 6C is a flowchart for describing a user authentication process by using the stored 3D face information.

FIG. 6C is a flowchart performed after operation S619 of FIG. 6A.

Referring to FIG. 6C, in operation S621, the controller 180 may register the 3D face information of the user in the memory 170, and then, may obtain a face image through each of the front camera 121a and the glance sensor 500.

The controller 180 may perform operations S603 to S607 on the face image obtained by the front camera 121a and may perform operations S609 to S615 on the face image obtained by the glance sensor 500.

As in operation S617, the controller 180 may generate the 3D face information, based on the metadata extracted from the 2D face image obtained by the front camera 121a and the 2D face image obtained by the glance sensor 500 in operation S623.

In operation S625, the controller 180 may determine whether the generated 3D face information matches 3D face information registered in the memory 170.

In an embodiment, the controller 180 may search the memory 170 to determine whether the generated 3D face information is stored in the memory 170.

In detail, when a face image included in newly generated 3D face information and a face angle corresponding to the face image respectively match a previously stored face image and a face angle corresponding to the previously stored face image, the controller 180 may determine whether the newly generated 3D face information is registered 3D face information.

When the generated 3D face information matches the 3D face information registered in the memory 170, the controller 180 may notify that user authentication succeeds in operation S627.

In an embodiment, the controller 180 may output, through the audio output module 152, a voice for notifying that the user authentication succeeds.

In another embodiment, the controller 180 may output, through the display unit 151, a message for notifying that the user authentication succeeds.

In another embodiment, the controller 180 may output, through the display unit 151, the message for notifying that the user authentication succeeds while outputting, through the audio output module 152, the voice for notifying that the user authentication succeeds.

In another embodiment, the controller 180 may display, on the display unit 151, a screen after the authentication is allowed, without notifying the success of the user authentication through the audio output module 152 or the display unit 151.

In an application requiring authentication, the screen after the authentication is allowed may be an execution screen of an application displayed after authentication is released.

On the other hand, when the generated 3D face information does not match the 3D face information registered in the memory 170, the controller 180 may notify that the user authentication fails.

Hereinafter, an optimal disposition structure of the front camera 121*a* and the glance sensor 500 necessary for generating 3D face information will be described.

In order to realize the optimal disposition structure of the front camera 121*a* and the glance sensor 500, desired variables may include a field of view (FOV) of the front camera 121*a*, an FOV of the glance sensor 500, a tilting angle of the glance sensor 500, a distance between the front camera 121*a* and the user, a distance between the glance sensor 500 and the user, a maximum distance (arbitrarily defined) of an image obtainable through the front camera 121*a*, a maximum distance (arbitrarily defined) of an image obtainable through the glance sensor 500, and a distance between the front camera 121*a* and the glance sensor 500.

Hereinafter, a method of setting an optimal disposition of the glance sensor by using the variables will be described.

Figure 7:
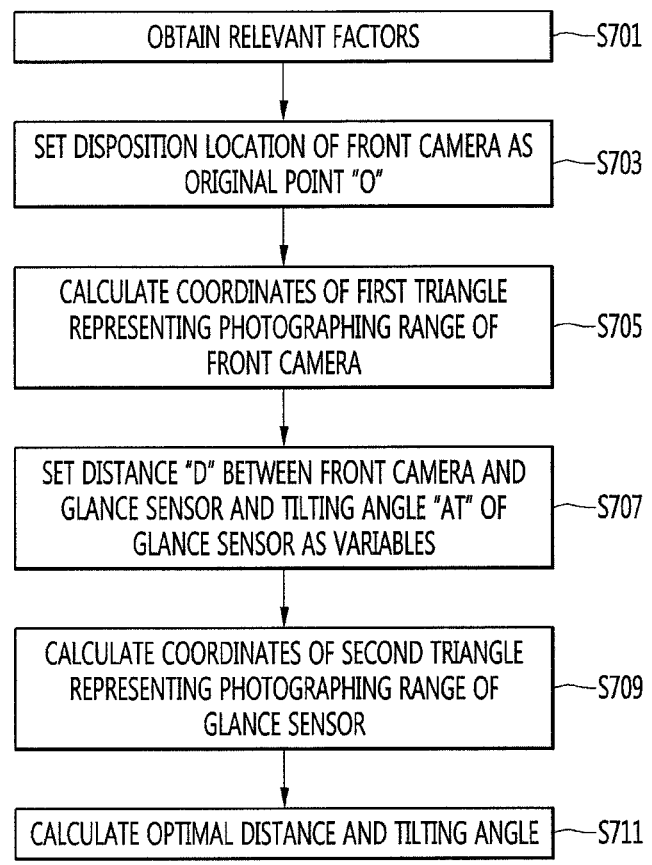
FIG. 7 is a flowchart for describing a method of setting an optimal disposition of a glance sensor according to an embodiment of the present invention.

FIG. 7 is a flowchart for describing a method of setting an optimal disposition of the glance sensor 500 according to an embodiment of the present invention.

Hereinafter, in the following description, it is assumed that when a disposition of the front camera 121*a* is fixed, a method of determining an optimal disposition of the glance sensor 500 is performed.

In operation S701, the controller 180 of the mobile terminal 100 may obtain relevant factors for determining an optimal disposition of the glance sensor 500.

In an embodiment, the relevant factors for determining the optimal disposition of the glance sensor 500 may include an FOV "θc" of the front camera 121*a*, an FOV "θg" of the glance sensor 500, a tilting angle "αt" of the glance sensor 500, a distance "Dc" between the front camera 121*a* and the user, a distance "Dg" between the glance sensor 500 and the user, a maximum photographing distance "Dc_max" of the front camera 121*a*, a maximum photographing distance "Dg_max" of the glance sensor 500, and a distance "d" between the front camera 121*a* and the glance sensor 500.

Figure 8:
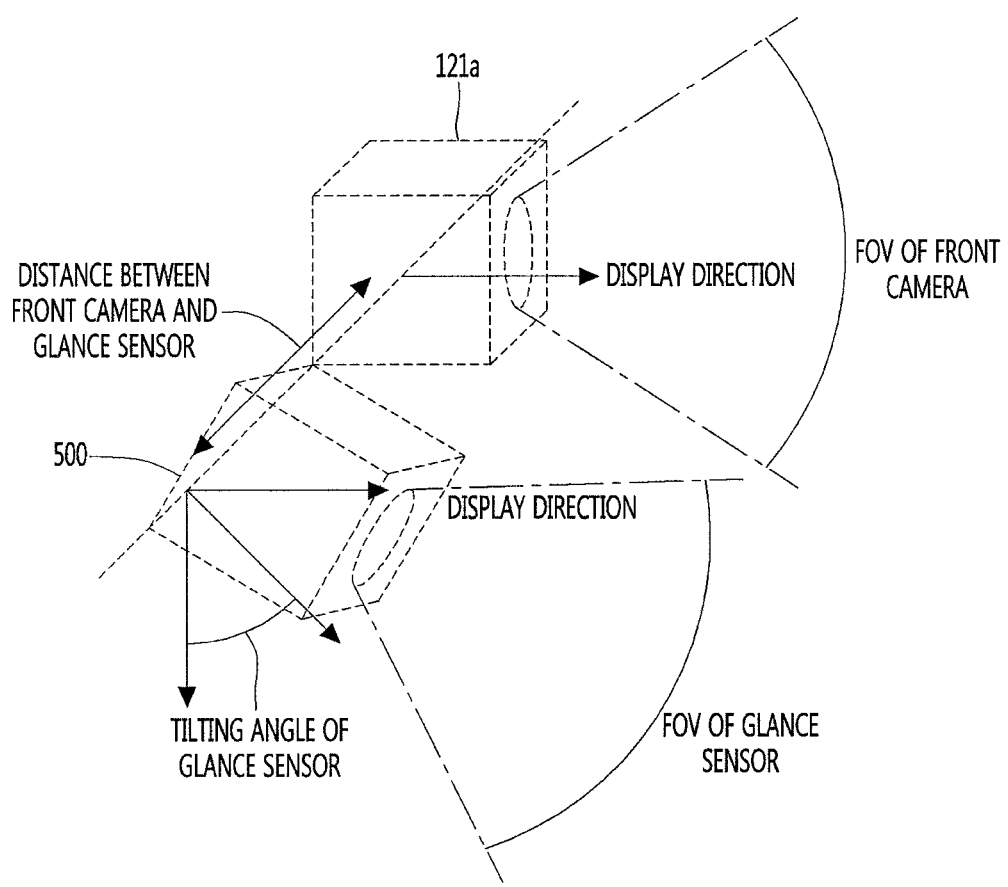

The relevant factors will be described in detail with reference to FIGS. 8 and 9.

FIGS. 8 to 14C are diagrams for describing a process of calculating a tilting angle of a glance sensor and a distance from the glance sensor to a front camera by using relevant factors for determining an optimal disposition of the glance sensor according to an embodiment of the present invention.

A process of determining an optimal disposition of the glance sensor 500 may be a process of obtaining the distance "d" between the front camera 121*a* and the glance sensor 500 which are optimal and the tilting angle "αt" of the glance sensor 500.

Referring to FIG. 5, the front camera 121*a* and the glance sensor 500 are illustrated.

The front camera 121*a* and the glance sensor 500 may be disposed on the same line in an upper end of a bezel configuring the mobile terminal 100, but this is merely an embodiment.

A display direction may be a vertical up direction with respect to the screen of the display unit 151 of the mobile terminal 500.

The FOV "θc" of the front camera 121*a* and the FOV "θg" of the glance sensor 500 may each be a value which is determined based on a setting by a manufacturer.

Moreover, the distance "Dc" between the front camera 121*a* and the user, the distance "Dg" between the glance sensor 500 and the user, the maximum photographing distance "Dc_max" of the front camera 121*a*, and the maximum photographing distance "Dg_max" of the glance sensor 500 may each be a fixed value which is set by the user.

The distance "Dc" between the front camera 121*a* and the user and the distance "Dg" between the glance sensor 500 and the user may each be within a range of 25 cm to 45 cm.

The maximum photographing distance "Dc_max" of the front camera 121*a* and the maximum photographing distance "Dg_max" of the glance sensor 500 may each exceed 56.7 cm.

The reason that each of the maximum photographing distance "Dc_max" of the front camera 121*a* and the maximum photographing distance "Dg_max" of the glance sensor 500 should be fixed is because an authentication process based on face recognition is not performed when a distance between the mobile terminal 100 and a user exceeds a specific distance.

FIG. 7 will be described again.

In operation S703, the controller 180 may set a disposition location of the front camera 121*a* as an original point "O".

In operation S705, the controller 180 may calculate coordinates of a first triangle representing a photographing range of the front camera 121*a* with respect the set original point "O".

This will be described with reference to FIG. 9.

Figure 9:
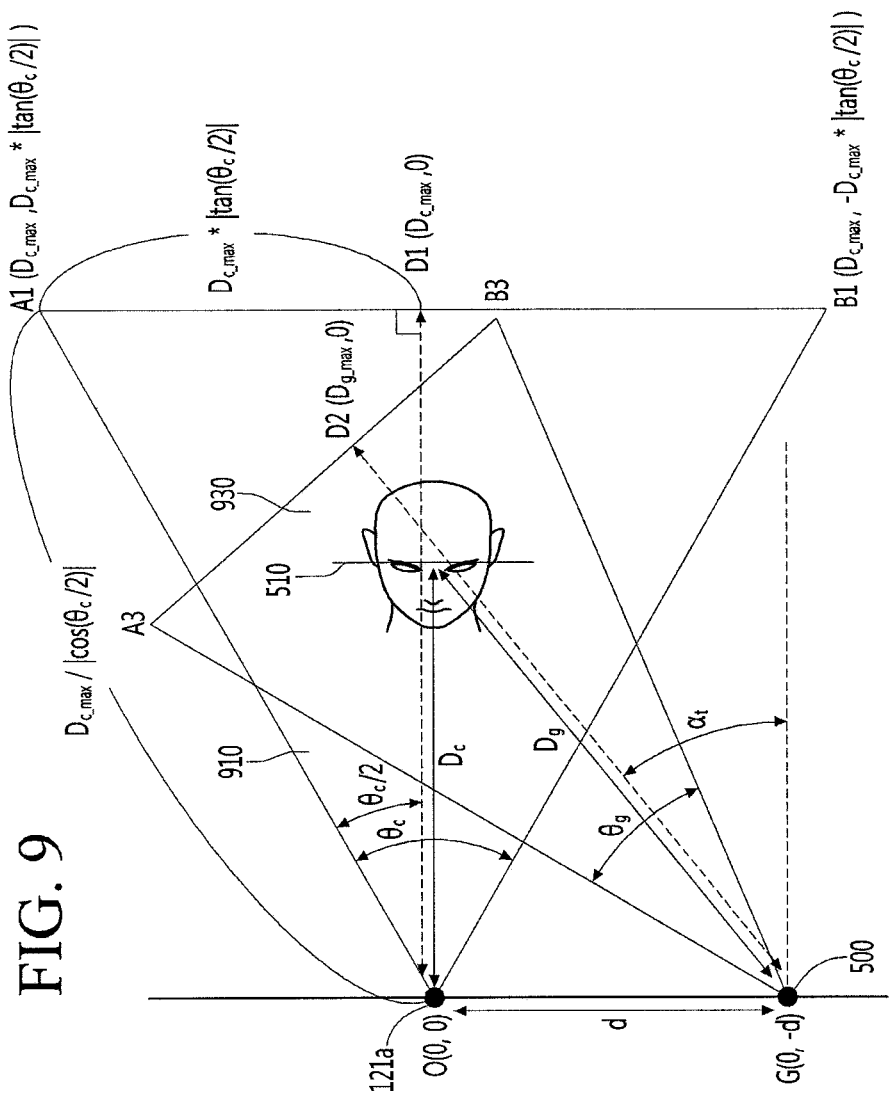

Referring to FIG. 9, a first triangle 910 formed based on an original point "O" of the front camera 121*a*, the FOV "θc" of the front camera 121*a*, and the maximum photographing distance "Dc_max" of the front camera 121*a* is illustrated.

The first triangle 910 may be a figure representing a range which enables the front camera 121*a* to photograph a user 510 for recognizing the user 510.

Three vertexes O, A1, and A2 of the first triangle 910 may be used to calculate an area of the first triangle 910.

Coordinates of each of the three vertexes O, A1, and A2 of the first triangle 910 may obtained based on the FOV "θc" of the front camera 121*a* and the maximum photographing distance "Dc_max" of the front camera 121*a*.

That is, coordinates of A1 may be calculated based on a triangular function formula as follows.

$$A1 = (D_{c\_max}, D_{c\_max} * |\tan(\theta_c/2)|)$$ [coordinates of A1]

Moreover, coordinates of B1 may be calculated based on a triangular function formula as follows.

$$B1 = (D_{c\_max}, -D_{c\_max} * |\tan(\theta_c/2)|)$$ [coordinates of B1]

FIG. 7 will be described again.

In operation S707, the controller 180 may set the distance "d" between the front camera 121a and the glance sensor 500 and the tilting angle "αt" of the glance sensor 500 as variables.

That is, each of the distance "d" between the front camera 121a and the glance sensor 500 and the tilting angle "αt" of the glance sensor 500 may be a variable value instead of a fixed value.

The distance "d" between the front camera 121a and the glance sensor 500 may not exceed a widthwise length of the mobile terminal 100.

In operation S709, by using the distance "d" between the front camera 121a and the glance sensor 500 and the tilting angle "αt" of the glance sensor 500, the controller 180 may calculate coordinates of a second triangle 930 representing a photographing range of the glance sensor 500.

The photographing range of the glance sensor 500 may represent a region capable of being obtained through photographing by the glance sensor 500.

The photographing range of the glance sensor 500 may be a triangle representing a photographable region for recognizing a user.

Coordinates of each of three vertexes G, A3, and B3 of the second triangle 930 may obtained based on a state before the glance sensor 500 is tilted.

This will be described with reference to FIG. 10.

Figure 10:
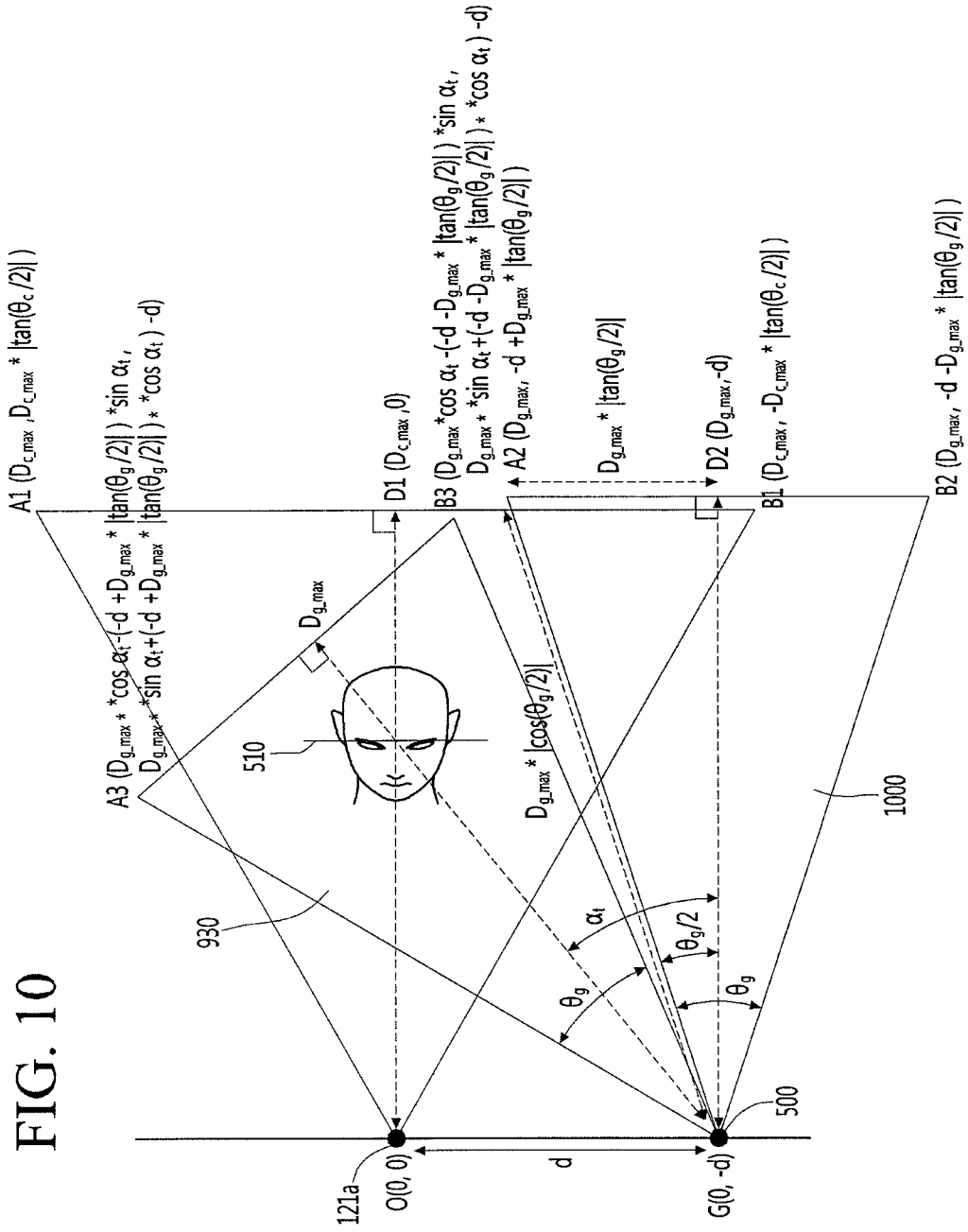

FIG. 10 is a diagram for describing a process of calculating the coordinates of the second triangle representing the photographing range of the glance sensor.

First, the controller 180 may calculate coordinates G, A2, and B2 of a third triangle 1000 representing the photographing range of the glance sensor 500 before the glance sensor 500 is tilted, with respect to coordinates G(0, −d) of a location at which the glance sensor 500 is disposed.

The coordinates G, A2, and B2 of the third triangle 1000 may be calculated based on the FOV "θg" of the glance sensor 500 and the maximum photographing distance "Dg_max" of the glance sensor 500.

Likewise, by using a triangular function formula, coordinates of A2 and B2 may be obtained as follows.

$$A2 = (D_{g\_max}, -d + D_{g\_max} * |\tan(\theta_g/2)|)$$ [coordinates of A2]

$$B2 = (D_{g\_max}, -d - D_{g\_max} * |\tan(\theta_g/2)|)$$ [coordinates of B2]

Subsequently, in a state where rotation is performed by the tilting angle "αt" of the glance sensor 500, a rotational conversion formula may be used for calculating the coordinates G, A3, and B3 of the second triangle 930.

The coordinates of A3 and B3 obtained through the rotational conversion formula with respect to the coordinates G of the glance sensor 500 may be as follows.

$$A3 = (D_{g\_max} * \cos \alpha_t - (-d + D_{g\_max} * |\tan(\theta_g/2)|) * \sin \alpha_t, D_{g\_max} * \sin \alpha_t + (-d + D_{g\_max} * |\tan(\theta_g/2)|) * \cos \alpha_t) - d)$$ [coordinates of A3]

$$B3 = (D_{g\_max} * \cos \alpha_t - (-d - D_{g\_max} * |\tan(\theta_g/2)|) * \sin \alpha_t, D_{g\_max} * \sin \alpha_t + (-d - D_{g\_max} * |\tan(\theta_g/2)|) * \cos \alpha_t) - d)$$ [coordinates of B3]

FIG. 7 will be described again.

In operation S711, the controller 180 may calculate the distance "d" between the front camera 121a and the glance sensor 500 which are optimal and the tilting angle "αt" of the glance sensor 500, based on the calculated coordinates of the second triangle.

In an embodiment, the controller 180 may calculate an area of a region where the first triangle overlaps the second triangle, based on the coordinates of the first triangle and the coordinates of the second triangle.

The controller 180 may calculate, as an optimal disposition location of the glance sensor 500, the distance "d" between the front camera 121a and the glance sensor 500 and the tilting angle "αt" of the glance sensor 500, in which the calculated area is the maximum.

That is, the controller 180 may calculate a disposition location of the glance sensor 500 in which an area of an overlap region, where a region photographable by the front camera 121a overlaps a region photographable by the glance sensor 500, is the maximum. The area of the overlap region being the maximum may denote that a probability of detecting a face region of a user located in front of the mobile terminal 100 is high, and this may denote that a probability of face recognition is high.

This will be described below with reference to FIG. 11.

Figure 11:
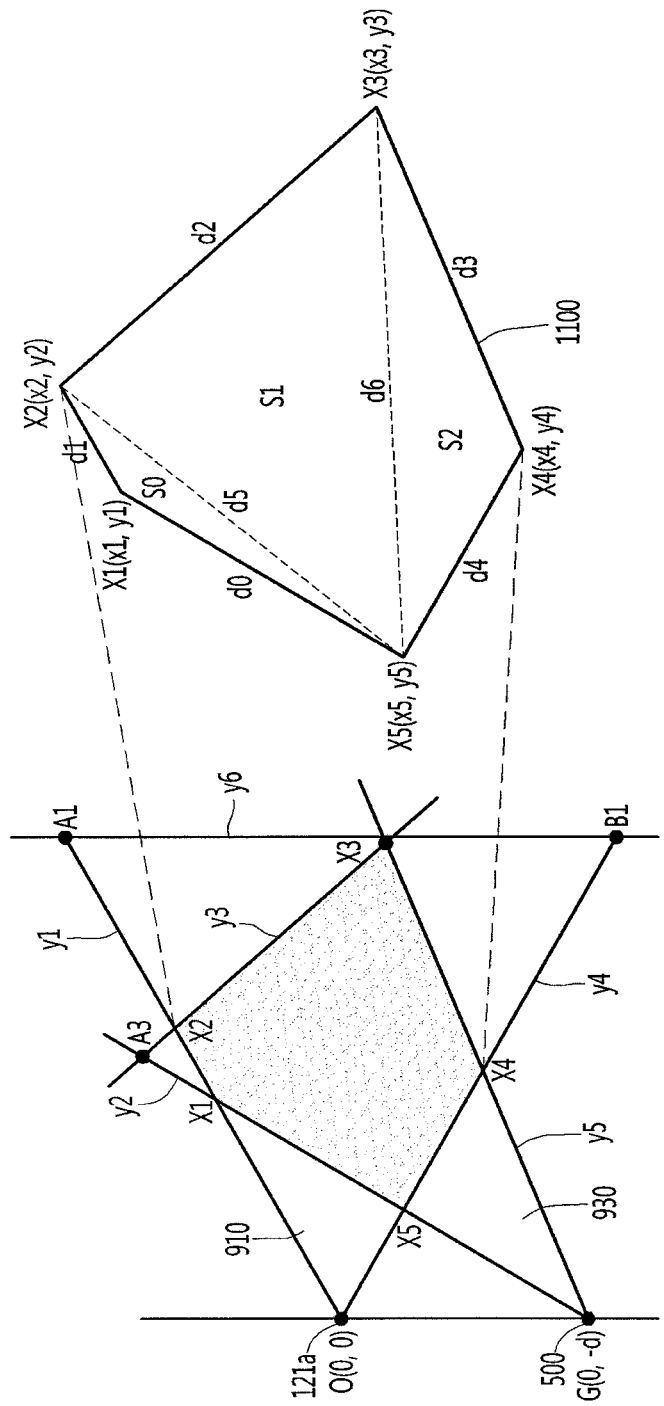

Referring to FIG. 11, an area of an overlap region 1100 where the first triangle 910 overlaps the second triangle 930 may be calculated based on the coordinates of the first triangle 910 and the second triangle 930 calculated in FIGS. 9 and 10.

That is, the controller 180 may calculate a plurality of rectilinear equations consisting of two coordinates, calculate a cross-point of two rectilinear equations, and calculate the area of the overlap region 1100.

In detail, by using a formula for calculating a rectilinear equation, a first rectilinear equation y1 connecting coordinates O and A1 may be expressed as follows.

[first rectilinear equation]

$$y1 = \frac{D_{c\_max} \times \left|\tan\frac{\theta_c}{2}\right|}{D_{c\_max}}(x1)$$

A second rectilinear equation y2 connecting coordinates G and A3 may be expressed as follows.

[second rectilinear equation]

$$y2 = \frac{\left(D_{g\_max} \times \sin \alpha_t + \left(D_{g\_max} \times \left|\tan\frac{\theta_g}{2}\right|\right) \times \cos \alpha_t\right) - d + d}{\left(D_{g\_max} \times \cos \alpha_t - \left(D_{g\_max} \times \left|\tan\frac{\theta_g}{2}\right|\right) \times \sin \alpha_t\right) - O}(x2) - d$$

A third rectilinear equation y3 connecting coordinates A3 and B3 may be expressed as follows.

[third rectilinear equation]

$$y3 - \left(D_{g\_max} \times \sin \alpha_t + \left(D_{g\_max} \times \left|\tan\frac{\theta_g}{2}\right|\right)\right) \times \cos \alpha_t - d =$$

-continued $$\left(D_{g\_max} \times \sin \alpha_t + \left(D_{g\_max} \times \left|\tan\frac{\theta_g}{2}\right|\right) \times \cos \alpha_t - d\right) -$$

$$\frac{\left(D_{g\_max} \times \sin \alpha_t + \left(D_{g\_max} \times \left|\tan\frac{\theta_g}{2}\right|\right) \times \cos \alpha_t - d\right)}{\left(D_{g\_max} \times \cos \alpha_t - \left(D_{g\_max} \times \left|\tan\frac{\theta_g}{2}\right|\right) \times \sin \alpha_t\right) -}$$

$$\left(D_{g\_max} \times \cos \alpha_t - \left(D_{g\_max} \times \left|\tan\frac{\theta_g}{2}\right|\right) \times \sin \alpha_t\right)$$

$$\left(x3 - \left(\left(D_{g\_max} \times \cos \alpha_t - \left(D_{g\_max} \times \left|\tan\left(\frac{\theta_g}{2}\right)\right|\right)\right) \times \sin \alpha_t\right)\right)$$

A fourth rectilinear equation y4 connecting coordinates O and B1 may be expressed as follows.

[fourth rectilinear equation]

$$y4 = \frac{-D_{c\_max} \times \left|\tan\frac{\theta_c}{2}\right|}{D_{c\_max}}(x4)$$

A fifth rectilinear equation y5 connecting coordinates O and B3 may be expressed as follows.

[fifth rectilinear equation]

$$y5 = \frac{\left(D_{g\_max} \times \sin \alpha_t - \left(D_{g\_max} \times \left|\tan\frac{\theta_g}{2}\right|\right) \times \cos \alpha_t\right) - d + d}{\left(D_{g\_max} \times \cos \alpha_t + \left(D_{g\_max} \times \left|\tan\frac{\theta_g}{2}\right|\right) \times \sin \alpha_t\right) - O}(x5) - d$$

A sixth rectilinear equation y6 connecting coordinates A1 and B1 may be expressed as follows.

$$y6 = D_{c\_max} \quad \text{[sixth rectilinear equation]}$$

Subsequently, the controller 180 may calculate crosspoints X1 to X5 between the first to sixth rectilinear equations.

The controller 180 may calculate lengths "d0 to d4" of a polygon formed by the overlap region 1100, based on a formula for calculating a distance between two points.

Moreover, the controller 180 may calculate lengths "d5 and d6" of two division lines for dividing the overlap 1100 into three triangles, based on the formula for calculating a distance between two points.

The lengths "d0 to d6" may be calculated as expressed in the following Equation (1):

$$d_0 = \sqrt{(x_1-x_0)^2 + (y_1-y_0)^2}$$

$$d_1 = \sqrt{(x_2-x_1)^2 + (y_2-y_1)^2}$$

$$d_2 = \sqrt{(x_3-x_2)^2 + (y_3-y_2)^2}$$

$$d_3 = \sqrt{(x_4-x_3)^2 + (y_4-y_3)^2}$$

$$d_4 = \sqrt{(x_0-x_4)^2 + (y_0-y_4)^2}$$

$$d_5 = \sqrt{(x_0-x_2)^2 + (y_0-y_2)^2}$$

$$d_6 = \sqrt{(x_0-x_3)^2 + (y_0-y_3)^2} \quad (1)$$

Subsequently, the controller 180 may use Heron's formula for calculating the area of the overlap region 1100 divided into the three triangles.

An area of each of the three triangles may be calculated as expressed in the following Equation (2), based on the Heron's formula:

$$S_0 = \sqrt{\left(\frac{d_0+d_1+d_5}{2}\right)\left(\frac{d_0+d_1+d_5}{2}-d_0\right)} \quad (2)$$
$$\sqrt{\left(\frac{d_0+d_1+d_5}{2}-d_1\right)\left(\frac{d_0+d_1+d_5}{2}-d_5\right)}$$

$$S_1 = \sqrt{\left(\frac{d_5+d_2+d_6}{2}\right)\left(\frac{d_5+d_2+d_6}{2}-d_5\right)}$$
$$\sqrt{\left(\frac{d_5+d_2+d_6}{2}-d_2\right)\left(\frac{d_5+d_2+d_6}{2}-d_6\right)}$$

$$S_2 = \sqrt{\left(\frac{d_6+d_3+d_4}{2}\right)\left(\frac{d_6+d_3+d_4}{2}-d_6\right)}$$
$$\sqrt{\left(\frac{d_6+d_3+d_4}{2}-d_3\right)\left(\frac{d_6+d_3+d_4}{2}-d_4\right)}$$

If the area of each of the three triangles is calculated as expressed in Equation (2), a total area of the overlap region 1100 may be calculated as expressed in the following Equation (3):

$$S = S_0 + S_1 + S_2 \quad (3)$$

The controller 180 may obtain the distance "d" between the front camera 121a and the glance sensor 500 and the tilting angle "αt" of the glance sensor 500, in which an area "S" of the overlap region 1100 is the maximum.

The area "S" of the overlap region 1100 being the maximum may denote that face recognition using the front camera 121a and the glance sensor 500 is performed in an optimal state.

The area "S" of the overlap region 1100 being the maximum may denote that the distance "d" between the front camera 121a and the glance sensor 500 is obtained by changing the tilting angle "αt" of the glance sensor 500.

Hereinafter, experiment data which is obtained by measuring a distance between the front camera 121a and the glance sensor 500 by using values of factors which are set for an optimal disposition of the glance sensor 500 will be described.

FIGS. 12A to 14C are diagrams showing a result of experiment data obtained through an experiment performed for obtaining an optimal disposition location of the glance sensor 500 by using values of relevant factors which are set for an optimal disposition of the glance sensor 500.

In FIGS. 12A to 14C, it may be assumed that an FOV "θc" of the front camera 121a may be 120 degrees, an FOV "θg" of the glance sensor 500 may be 67 degrees, a maximum photographing distance "Dc_max" of the front camera 121a may be 56.7 cm, a maximum photographing distance "Dg_max" of the glance sensor 500 may be 56.7 cm, and a distance "d" between the front camera 121a and the glance sensor 500 may not exceed 7.5 cm.

Moreover, in FIGS. 12A to 14C, it may be assumed that the glance sensor 500 is disposed on the left of the front camera 121a.

First, FIGS. 12A to 12C will be described.

In FIGS. 12A to 12C, it may be assumed that a tilting angle "αt" of the glance sensor 500 is in a state of being tilted by 5 degrees with respect to a left direction. Also, it may be assumed that tilting in a vertical direction is not performed.

FIG. 12A shows a table showing set values of relevant factors.

Moreover, units of the set values may be degrees, cm, radian, and mm.

In FIG. 12B, an original point may be a disposition location of the front camera 121a, and a center point may be a disposition location of the glance sensor 500.

Moreover, with respect to the original point, a first triangle 910 and a second triangle 930 representing a photographable region capable of being photographed by the front camera 121a are illustrated.

Coordinates of three vertexes O, A1, and B1 of the first triangle 910 may be obtained according to the embodiment of FIG. 9.

Referring to FIG. 12C, coordinates of three vertexes G, A3, and B3 of the second triangle 930 based on a variation of a distance "d" between the front camera 121a and the glance sensor 500 are illustrated.

The coordinates of the three vertexes G, A3, and B3 of the second triangle 930 may be a result obtained by changing the distance "d" between the front camera 121a and the glance sensor 500 by units of 5 mm.

The coordinates of the three vertexes G, A3, and B3 of the second triangle 930 may be obtained according to the embodiment of FIG. 10.

Referring to FIG. 12C, when the tilting angle "αt" of the glance sensor 500 is by 5 degrees in a left direction, d where an area of an overlap region between the first triangle 910 and the second triangle 930 is the maximum may be 55 mm.

That is, when the tilting angle "αt" of the glance sensor 500 is by 5 degrees in the left direction, an optimal disposition location of the glance sensor 500 may be a point at which the glance sensor 500 is spaced apart from the front camera 121a by 55 mm and located.

Hereinafter, FIGS. 13A to 13C will be described.

Figure 13B:
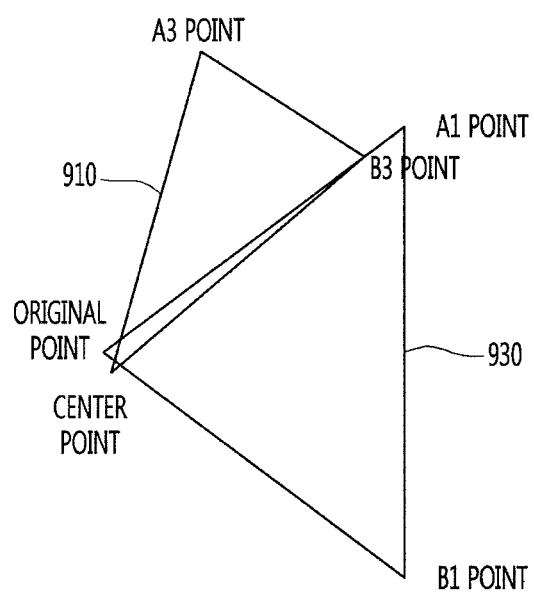

In FIGS. 13A to 13C, it may be assumed that a tilting angle "αt" of the glance sensor 500 is in a state of being tilted by 50 degrees. Also, it may be assumed that tilting in a vertical direction is not performed.

FIG. 13A shows a table showing set values of relevant factors.

Moreover, units of the set values may be degrees, cm, radian, and mm.

In FIG. 13B, an original point may be a disposition location of the front camera 121a, and a center point may be a disposition location of the glance sensor 500.

Moreover, with respect to the original point, a first triangle 910 and a second triangle 930 representing a photographable region capable of being photographed by the front camera 121a are illustrated.

Coordinates of three vertexes O, A1, and B1 of the first triangle 910 may be obtained according to the embodiment of FIG. 9.

Referring to FIG. 13C, coordinates of three vertexes G, A3, and B3 of the second triangle 930 based on a variation of a distance "d" between the front camera 121a and the glance sensor 500 are illustrated.

The coordinates of the three vertexes G, A3, and B3 of the second triangle 930 may be a result obtained by changing the distance "d" between the front camera 121a and the glance sensor 500 by units of 5 mm.

The coordinates of the three vertexes G, A3, and B3 of the second triangle 930 may be obtained according to the embodiment of FIG. 10.

Referring to FIG. 13C, when the tilting angle "αt" of the glance sensor 500 is by 50 degrees in a left direction, d where an area of an overlap region between the first triangle 910 and the second triangle 930 is the maximum may be 55 mm.

That is, when the tilting angle "αt" of the glance sensor 500 is by 50 degrees in the left direction, an optimal disposition location of the glance sensor 500 may be a point at which the glance sensor 500 is spaced apart from the front camera 121a by 55 mm and located.

However, when the tilting angle "αt" of the glance sensor 500 is equal to or more than 50 degrees, the area of the overlap region between the first triangle 910 and the second triangle 930 may be reduced, and thus, it is not significant to obtain d having an optimized value.

Hereinafter, FIGS. 14A to 14C will be described.

Figure 14B:
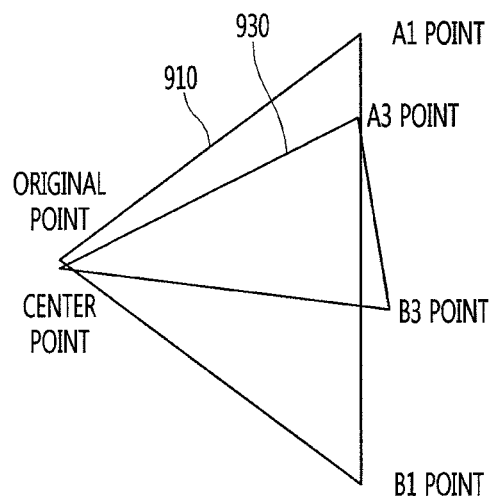
Figures 14C, 15A:
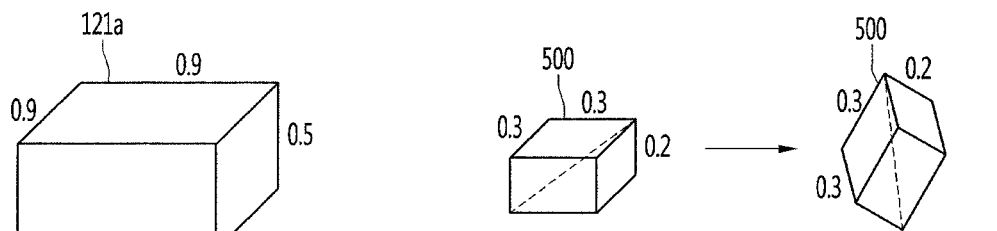

In FIGS. 14A to 14C, it may be assumed that a tilting angle "αt" of the glance sensor 500 is in a state of being tilted by 10 degrees. Also, it may be assumed that tilting in a vertical direction is not performed.

FIG. 14A shows a table showing set values of relevant factors.

Moreover, units of the set values may be degrees, cm, radian, and mm.

In FIG. 14B, an original point may be a disposition location of the front camera 121a, and a center point may be a disposition location of the glance sensor 500.

Moreover, with respect to the original point, a first triangle 910 and a second triangle 930 representing a photographable region capable of being photographed by the front camera 121a are illustrated.

Coordinates of three vertexes O, A1, and B1 of the first triangle 910 may be obtained according to the embodiment of FIG. 9.

Referring to FIG. 14C, coordinates of three vertexes G, A3, and B3 of the second triangle 930 based on a variation of a distance "d" between the front camera 121a and the glance sensor 500 are illustrated.

The coordinates of the three vertexes G, A3, and B3 of the second triangle 930 may be a result obtained by changing the distance "d" between the front camera 121a and the glance sensor 500 by units of 5 mm.

The coordinates of the three vertexes G, A3, and B3 of the second triangle 930 may be obtained according to the embodiment of FIG. 10.

Referring to FIG. 14C, when the tilting angle "αt" of the glance sensor 500 is by 10 degrees in a left direction, d where an area of an overlap region between the first triangle 910 and the second triangle 930 is the maximum may be 40 mm.

That is, when the tilting angle "αt" of the glance sensor 500 is by 50 degrees in the left direction, an optimal disposition location of the glance sensor 500 may be a point at which the glance sensor 500 is spaced apart from the front camera 121a by 40 mm and located.

As described above, when a location of the front camera 121a is set and the tilting angle "αt" of the glance sensor 500 is set according to a design of a manufacturer, an optical distance "d" between the front camera 121a and the glance sensor 500 may be obtained.

Hereinafter, a thickness of the glance sensor 500 which is tilted when the glance sensor 500 is tilted and equipped in the mobile terminal 100 will be described.

Figure 15B:
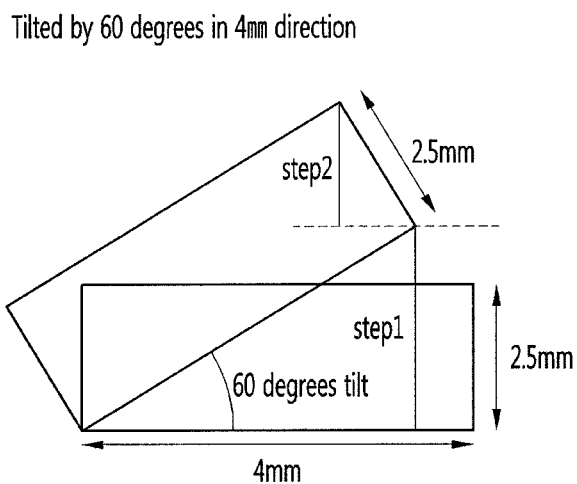
Figure 15C:
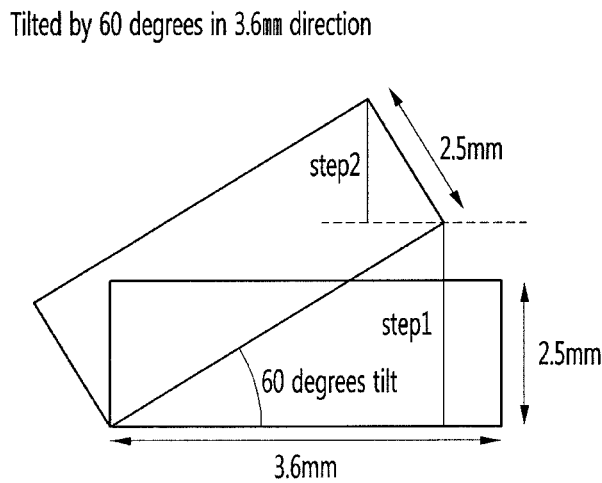

FIGS. 15A to 15C are diagrams for describing a thickness of a glance sensor equipped in a tilted state.

The front camera 121a and the glance sensor 500 illustrated in FIGS. 15A to 15C may be provided as a hexahedral module provided through a housing.

Referring to FIG. 15A, a numerical value of a size of the front camera 121a is illustrated. A unit may be cm. In this case, a widthwise length of the front camera 121a may be 0.9, a lengthwise length may be 0.9, and a thickness may be 0.5.

A widthwise length of the glance sensor 500 may be 0.3, a lengthwise length may be 0.3, and a thickness may be 0.2.

Here, the front camera 121a may be a wide angle camera, but this is merely an example.

When the glance sensor 500 is tilted by 60 degrees, a hexahedral diagonal length of the glance sensor 500 may be 0.469. That is, even when the glance sensor 500 is abnormally tilted, the hexahedral diagonal length of the glance sensor 500 may be less than a thickness of the front camera 121a.

Therefore, even in a case where the tilted glance sensor 500 is disposed adjacent to the front camera 121a, a thickness of the tilted glance sensor 500 may be less than that of the front camera 121a, and thus, a problem of a design does not occur.

Moreover, the glance sensor 500 is for obtaining metadata of a face instead of extracting a face of a user, and thus, even when a distortion of an image occurs due to tilting, there is no problem.

Hereinafter, FIGS. 15B and 5C will be described.

FIGS. 15B and 5C are diagrams for describing a variation of a thickness caused by tilting when in a case where a widthwise length, a lengthwise length, and a thickness of the glance sensor 500 are differently designed.

FIG. 15B illustrates a case where a widthwise length of the glance sensor 500 is 4 mm, a lengthwise length of the glance sensor 500 is 4 mm, and a thickness of the glance sensor 500 is 2.5 mm.

As illustrated in FIG. 15B, even when the glance sensor 500 is tilted by 60 degrees, a thickness of the glance sensor 500 calculated based on a triangular function formula may be 4.714 mm and may be less than that of the front camera 121a.

FIG. 15C illustrates a case where a widthwise length of the glance sensor 500 is 3.6 mm, a lengthwise length of the glance sensor 500 is 3.6 mm, and a thickness of the glance sensor 500 is 2.5 mm.

As illustrated in FIG. 15C, even when the glance sensor 500 is tilted by 60 degrees, a thickness of the glance sensor 500 calculated based on the triangular function formula may be 4.3 mm and may be less than that of the front camera 121a.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a front camera configured to obtain a two-dimensional (2D) face image of a user;
   a glance sensor tilted by a certain angle and disposed adjacent to the front camera to obtain metadata of the 2D face image; and
   a controller obtaining a distance between the glance sensor and the front camera, the distance enabling an area of an overlap region, where a first region representing a range photographable by the front camera overlaps a second region representing a range photographable by the glance sensor, to be the maximum.

2. The mobile terminal of claim 1, wherein the controller is configured to obtain the distance, enabling the area of the overlap region to be the maximum, between the glance sensor and the front camera by varying a tilting angle of the glance sensor.

3. The mobile terminal of claim 2, wherein the controller is configured to set the distance, enabling the area of the overlap region to be the maximum, between the glance sensor and the front camera and the tilting angle of the glance sensor as an optimal disposition location of the glance sensor.

4. The mobile terminal of claim 3, wherein the controller is configured to set a disposition location of the front camera as an original point and calculates coordinates of a first triangle representing the first region, based on a field of view of the front camera and a maximum photographing distance of the front camera.

5. The mobile terminal of claim 4, wherein the controller is configured to calculate coordinates of a second triangle representing the second region, based on a field of view of the glance sensor, a maximum photographing distance of the glance sensor, a distance between the front camera and the glance sensor, and a tilting angle of the glance sensor.

6. The mobile terminal of claim 5, wherein
   before the glance sensor is tilted, the controller is configured to calculate coordinates of a third triangle representing a third region photographable by the glance sensor, and
   the controller is configured to rotation-convert the coordinates of the third triangle, based on the tilting angle of the glance sensor and calculate the coordinates of the second triangle.

7. The mobile terminal of claim 6, wherein the controller is configured to calculate coordinates of the overlap region, based on the coordinates of the first triangle and the coordinates of the second triangle and calculates the area of the overlap region, based on the coordinates of the overlap region.

8. The mobile terminal of claim 1, wherein the controller is configured to generate three-dimensional (3D) face information, based on the 2D face image obtained by the front camera and metadata obtained by the glance sensor.

9. The mobile terminal of claim 8, wherein the metadata comprises one or more of an angle of a face of the user, a size of the face, and a location of the face.

10. The mobile terminal of claim 9, wherein the angle of the face comprises an angle by which the face is rotated about one or more of a pitch axis, a roll axis, and a yaw axis.

11. The mobile terminal of claim 8, further comprising a memory storing the generated 3D face information,
   wherein the controller is configured to performs a user authentication process by comparing the stored 3D face information with 3D face information obtained for user authentication.

12. The mobile terminal of claim 1, wherein the glance sensor is controlled to be permanently activated with a low power to obtain a front image and metadata of the front image.

13. The mobile terminal of claim 1, wherein the front camera and the glance sensor are disposed on the same line in an upper end of the mobile terminal.

14. The mobile terminal of claim 1, wherein the glance sensor is tilted in one direction of an up direction, a down direction, a left direction, and a right direction.

15. The mobile terminal of claim 1, wherein the metadata is data which is changed when the mobile terminal is tilted by an external physical force.

* * * * *